US009909045B2

(12) United States Patent
Rached

(10) Patent No.: US 9,909,045 B2
(45) Date of Patent: Mar. 6, 2018

(54) COMPOSITIONS BASED ON 2,3,3,4,4,4-HEXAFLUOROBUT-1-ENE

(71) Applicant: ARKEMA FRANCE, Colombes (FR)

(72) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/390,609

(22) PCT Filed: Mar. 29, 2013

(86) PCT No.: PCT/FR2013/050693
§ 371 (c)(1),
(2) Date: Oct. 3, 2014

(87) PCT Pub. No.: WO2013/150225
PCT Pub. Date: Oct. 10, 2013

(65) Prior Publication Data
US 2015/0096312 A1  Apr. 9, 2015

(30) Foreign Application Priority Data
Apr. 4, 2012 (FR) ..................... 12 53096

(51) Int. Cl.
*C09K 5/04*  (2006.01)
(52) U.S. Cl.
CPC ............... *C09K 5/045* (2013.01); *C09K 5/04* (2013.01); *C09K 2205/126* (2013.01); *C09K 2205/22* (2013.01)
(58) Field of Classification Search
CPC .............. C09K 5/045; C09K 2205/126; C09K 2205/22; C09K 2205/32
See application file for complete search history.

(56) References Cited

U.S. PATENT DOCUMENTS

| 5,076,064 A | 12/1991 | Kopko |
| 7,708,903 B2 | 5/2010 | Sievert et al. |
| 7,972,524 B2 | 7/2011 | Robin |
| 7,972,525 B2 | 7/2011 | Robin |
| 8,262,924 B2 | 9/2012 | Robin |
| 8,648,123 B2 | 2/2014 | Van Horn et al. |
| 8,680,037 B2 | 3/2014 | Robin |
| 8,821,749 B2 | 9/2014 | Robin |
| 9,145,507 B2 | 9/2015 | Rached |
| 9,157,018 B2 | 10/2015 | Rached et al. |
| 9,254,468 B2 | 2/2016 | Van Horn et al. |
| 9,267,066 B2 | 2/2016 | Rached |
| 9,359,541 B2 | 6/2016 | Rached |
| 9,404,678 B2 | 8/2016 | Van Horn |
| 9,528,038 B2 | 12/2016 | Rached |
| 9,528,039 B2 | 12/2016 | Rached |
| 2007/0096051 A1 | 5/2007 | Nappa et al. |
| 2007/0100009 A1 | 5/2007 | Creazzo et al. |
| 2007/0100010 A1 | 5/2007 | Creazzo et al. |
| 2007/0108403 A1* | 5/2007 | Sievert .................. C09K 5/045 252/67 |
| 2007/0187639 A1 | 8/2007 | Leck et al. |
| 2009/0143604 A1 | 6/2009 | Nappa et al. |
| 2009/0204444 A1 | 8/2009 | Tucker et al. |
| 2009/0302264 A1 | 12/2009 | Serrano et al. |
| 2010/0056124 A1 | 3/2010 | Keating et al. |
| 2010/0078585 A1 | 4/2010 | Robin |
| 2010/0112328 A1 | 5/2010 | Van Horn et al. |
| 2010/0154419 A1 | 6/2010 | Kontomaris |
| 2010/0163776 A1 | 7/2010 | Robin |
| 2010/0216904 A1 | 8/2010 | Loh et al. |
| 2010/0243943 A1 | 9/2010 | Robin |
| 2010/0326095 A1 | 12/2010 | Van Horn et al. |
| 2011/0001080 A1 | 1/2011 | Van Horn et al. |
| 2011/0006248 A1 | 1/2011 | Van Horn et al. |
| 2011/0088418 A1 | 4/2011 | Kontomaris et al. |
| 2011/0144216 A1 | 6/2011 | Hulse et al. |
| 2011/0197604 A1 | 8/2011 | Minor et al. |
| 2011/0215273 A1 | 9/2011 | Uenveren et al. |
| 2011/0237844 A1 | 9/2011 | Tung et al. |
| 2011/0260093 A1 | 10/2011 | Robin |
| 2012/0004299 A1 | 1/2012 | Hulse et al. |

(Continued)

FOREIGN PATENT DOCUMENTS

JP  2008-531836 A  8/2008
JP  2010-522816 A  7/2010

(Continued)

OTHER PUBLICATIONS

Morrison-Boyd, *Organic Chemistry*., 1973, Table 3.1, Allyn and Bacon, Inc. Boston, MA, USA (3 pages).
Rached, Wissam, U.S. Appl. No. 14/844,583 entitled "Compositions of 2,4,4,4-Tetrafluorobut-1-ENE and CIS-1,1,1,4,4,4-Hexafluorobut-2-ENE," filed in the U.S. Patent and Trademark Office on Sep. 3, 2015.
Rached, Wissam, et al., U.S. Appl. No. 14/861,073 entitled "Compositions of Chloro-Trifluoropropene and Hexafluorobutene," filed in the U.S. Patent and Trademark Office Sep. 22, 2015.
Office Action issued by the European Patent office in EP 10 816 413.8, dated Apr. 28, 2014, 4 pages.
Kim, M.S., et al., "A Study to Determine the Existence of an Azeotropic R-22 'Drop-in' Substitute," NISTIR 5784, Mar. 1996, 50 pages, U.S. Department of Commerce.

(Continued)

*Primary Examiner* — John R Hardee
(74) *Attorney, Agent, or Firm* — Buchanan Ingersoll & Rooney P.C.

(57) ABSTRACT

A composition including 2,3,3,4,4,4-hexafluorobut-1-ene as a mixture with one or more hydrocarbon, hydrofluorocarbon, ether, hydrofluoroether or fluoroolefin compounds having a boiling point of less than or equal to 0° C. Also, the use of such a composition in heat transfer applications. Also, a heat transfer installation including a vapor compression circuit containing such a composition as heat-transfer fluid or containing a heat-transfer composition including such a composition, and also one or more additives chosen from lubricants, stabilizers, surfactants, tracers, fluorescers, odorous agents and solubilizers, and mixtures thereof.

16 Claims, No Drawings

(56) References Cited

U.S. PATENT DOCUMENTS

| | | |
|---|---|---|
| 2012/0056124 A1 | 3/2012 | Robin |
| 2012/0085959 A1 | 4/2012 | Uenveren et al. |
| 2012/0117990 A1 | 5/2012 | Rached et al. |
| 2012/0117991 A1 | 5/2012 | Rached |
| 2012/0119136 A1 | 5/2012 | Yana Motta et al. |
| 2013/0098396 A1 | 4/2013 | Lousenberg et al. |
| 2013/0099154 A1 | 4/2013 | Boussand et al. |
| 2013/0104575 A1 | 5/2013 | Kontomaris |
| 2013/0111970 A1 | 5/2013 | Johnsen |
| 2013/0247602 A1 | 9/2013 | Boutier et al. |
| 2013/0255284 A1 | 10/2013 | Rached |
| 2013/0298581 A1 | 11/2013 | Kontomaris |
| 2014/0048739 A1 | 2/2014 | Rached et al. |
| 2014/0083119 A1 | 3/2014 | Rached |
| 2014/0191153 A1 | 7/2014 | Yana Motta et al. |
| 2014/0284516 A1 | 9/2014 | Johnsen |
| 2015/0376485 A1 | 12/2015 | Rached |
| 2016/0009973 A1 | 1/2016 | Rached et al. |
| 2016/0115362 A1 | 4/2016 | Rached |
| 2016/0137895 A1 | 5/2016 | Kontomaris et al. |

FOREIGN PATENT DOCUMENTS

| | | |
|---|---|---|
| JP | 2010-532395 A | 10/2010 |
| WO | WO 2006/094303 A2 | 9/2006 |
| WO | WO 2007/002625 A2 | 1/2007 |
| WO | WO 2007/002703 A2 | 1/2007 |
| WO | WO 2007/053697 A2 | 5/2007 |
| WO | WO 2008/121776 A1 | 10/2008 |
| WO | WO 2008/134061 A2 | 11/2008 |
| WO | WO 2008/154612 A1 | 12/2008 |
| WO | WO 2009/085937 A1 | 7/2009 |
| WO | WO 2009/108547 A1 | 9/2009 |
| WO | WO 2009/114397 A2 | 9/2009 |
| WO | WO 2009/114398 A1 | 9/2009 |
| WO | WO 2010/055146 A2 | 5/2010 |
| WO | WO 2010/059677 A2 | 5/2010 |
| WO | WO 2010/062888 A2 | 6/2010 |
| WO | WO 2010/080467 A2 | 7/2010 |
| WO | WO 2010/100254 A1 | 9/2010 |
| WO | WO 2010/129461 A2 | 11/2010 |
| WO | WO 2010/141527 A1 | 12/2010 |
| WO | WO 2010/141669 A1 | 12/2010 |
| WO | WO 2011/015737 A1 | 2/2011 |
| WO | WO 2011/084447 A2 | 7/2011 |
| WO | WO 2011/084553 A2 | 7/2011 |
| WO | WO 2011/137087 A1 | 11/2011 |
| WO | WO 2012/064477 A2 | 5/2012 |
| WO | WO 2012/069725 A1 | 5/2012 |
| WO | WO 2012/072910 A1 | 6/2012 |
| WO | WO 2013/004930 A1 | 1/2013 |

OTHER PUBLICATIONS

International Search Report (PCT/ISA/210) dated Jun. 5, 2013, by the European Patent Office as the International Searching Authority for International Application No. PCT/FR2013/050693.

Rached, Wissam, U.S. Appl. No. 14/990,546 entitled "Refrigerants Containing (E)-1,1,1,4,4,4-Hexafluorobut-2-ene," filed Jan. 7, 2016.

Sweeney, K. A., et al., "The Behavior of a Near-Azeotropic Refrigerant Mixture of R-32/R-125 in an Enhanced Tube," ACRO TR-94, Apr. 1996, Air Conditioning arid Refrigeration Center, University of Illinois, Urbana, IL, 19 pages.

Rached, Wissam, et al., U.S. Appl. No. 15/379,547 entitled "Compositions of Chloro-Trifluoropropene and Hexafluorobutene," filed Dec. 15, 2016.

* cited by examiner

COMPOSITIONS BASED ON 2,3,3,4,4,4-HEXAFLUOROBUT-1-ENE

FIELD OF THE INVENTION

The present invention relates to compositions based on 2,3,3,4,4,4-hexafluorobut-1-ene, and also to their use especially as heat-transfer fluids.

TECHNICAL BACKGROUND

Fluids based on fluorocarbon compounds are widely used in vapor-compression heat-transfer systems, especially air-conditioning, heat pump, refrigeration or freezing devices. The common feature of these devices is that they are based on a thermodynamic cycle comprising vaporization of fluid at low pressure (in which the fluid absorbs heat); the compression of the vaporized fluid up to a high pressure; the condensation of the vaporized fluid to liquid at high pressure (in which the fluid expels heat); and the depressurization of the fluid to complete the cycle.

The choice of a heat-transfer fluid (which may be a pure compound or a mixture of compounds) is dictated firstly by the thermodynamic properties of the fluid, and secondly by additional constraints. Thus, a particularly important criterion is that of the impact of the fluid under consideration on the environment. In particular, chlorinated compounds (chlorofluorocarbons and hydrochlorofluorocarbons) have the drawback of damaging the ozone layer. Non-chlorinated compounds such as hydrofluorocarbons, fluoro ethers and fluoroolefins are thus now generally preferred.

It is, however, necessary to develop other heat-transfer fluids that have a lower global warming potential (GWP) than that of the heat-transfer fluids currently used, and which have equivalent or improved performance qualities.

Document US 2009/0 143 604 describes processes for manufacturing fluoro alkanols and fluoroolefins. The synthesis of 2,3,3,4,4,4-hexafluorobut-1-ene (HFO-1336yf) is especially disclosed.

Document WO 2009/085 937 describes a secondary cooling loop system for an air conditioning system. Among the heat-transfer compounds that may be used is HFO-1336yf.

Document US 2009/0 302 264 describes heat-transfer compositions comprising a heat-transfer fluid, a lubricant and an acidic deactivator. HFO-1336yf is cited among the possible heat-transfer fluids.

Document US 2011/0 088 418 describes compositions comprising an ionic liquid and a fluoroolefin, which are useful for heat-transfer applications with absorption systems. HFO-1336yf is cited as an example of a fluoroolefin.

However, there is still a need to develop other heat-transfer fluids that have a relatively low GWP, and that are capable of replacing the usual heat-transfer fluids.

In particular, it is desirable to develop other low-GWP heat-transfer fluids that are quasi-azeotropic and/or that have good energy performance qualities when compared with the usual heat-transfer fluids (such as isobutane) and/or energy performance qualities that are better than those of the known low-GWP heat-transfer fluids.

SUMMARY OF THE INVENTION

The invention relates first to a composition comprising 2,3,3,4,4,4-hexafluorobut-1-ene as a mixture with one or more hydrocarbon, hydrofluorocarbon, ether, hydrofluoroether or fluoroolefin compounds with a boiling point of less than or equal to 0° C.

According to one embodiment, the composition consists of a mixture of 2,3,3,4,4,4-hexafluorobut-1-ene and of one or more hydrocarbon, hydrofluorocarbon, ether, hydrofluoroether or fluoroolefin compounds with a boiling point of less than or equal to 0° C.

According to one embodiment, the composition is a binary mixture of compounds; or is a ternary mixture of compounds.

According to one embodiment, the composition is a binary mixture of 2,3,3,4,4,4-hexafluorobut-1-ene with a hydrocarbon, hydrofluorocarbon, ether, hydrofluoroether or fluoroolefin compound with a boiling point of less than or equal to 0° C.; or is a ternary mixture of 2,3,3,4,4,4-hexafluorobut-1-ene with a first hydrocarbon, hydrofluorocarbon, ether, hydrofluoroether or fluoroolefin compound with a boiling point of less than or equal to 0° C. and with a second hydrocarbon, hydrofluorocarbon, ether, hydrofluoroether or fluoroolefin compound with a boiling point of less than or equal to 0° C.

According to one embodiment, the hydrocarbon, hydrofluorocarbon, ether, hydrofluoroether or fluoroolefin compound(s) with a boiling point of less than or equal to 0° C. have a boiling point of less than or equal to −5° C. and preferably less than or equal to −10° C.

According to one embodiment, the hydrocarbon, hydrofluorocarbon, ether, hydrofluoroether or fluoroolefin compound(s) with a boiling point of less than or equal to 0° C. are chosen from 1,3,3,3-tetrafluoropropene, 2,3,3,3-tetrafluoropropene, 1,1,3,3-tetrafluoropropene, 3,3,3-trifluoropropene, 2,3,3-trifluoropropene, 1,1,1,2-tetrafluoroethane, 1,1,2,2-tetrafluoroethane, pentafluoroethane, 1,1,1,2,3,3,3-heptafluoropropane, 1,1-difluoroethane, 1,1,1-trifluoropropane, isobutane and propane, and mixtures thereof.

According to one embodiment, the hydrocarbon, hydrofluorocarbon, ether, hydrofluoroether or fluoroolefin compound(s) with a boiling point of less than or equal to 0° C. are chosen from 1,3,3,3-tetrafluoropropene, 2,3,3,3-tetrafluoropropene, 1,1,1,2-tetrafluoroethane, 1,1,2,2-tetrafluoroethane, 1,1-difluoroethane and 1,1,1-trifluoropropane, and mixtures thereof.

According to one embodiment, the composition comprises or preferably consists of:
  a mixture of 2,3,3,4,4,4-hexafluorobut-1-ene and 1,3,3,3-tetrafluoropropene; or
  a mixture of 2,3,3,4,4,4-hexafluorobut-1-ene and 1,1,1-trifluoropropane; or
  a mixture of 2,3,3,4,4,4-hexafluorobut-1-ene and 1,1,2,2-tetrafluoroethane; or
  a mixture of 2,3,3,4,4,4-hexafluorobut-1-ene and 1,1,1,2-tetrafluoroethane; or
  a mixture of 2,3,3,4,4,4-hexafluorobut-1-ene and 1,1-difluoroethane; or
  a mixture of 2,3,3,4,4,4-hexafluorobut-1-ene, 1,1,1,2-tetrafluoroethane and 1,3,3,3-tetrafluoropropene; or
  a mixture of 2,3,3,4,4,4-hexafluorobut-1-ene, 1,1,1,2-tetrafluoroethane and 1,1,1-trifluoropropane;
  a mixture of 2,3,3,4,4,4-hexafluorobut-1-ene, 1,1,1,2-tetrafluoroethane and 1,1-difluoroethane.
  a mixture of 2,3,3,4,4,4-hexafluorobut-1-ene, 1,1,2,2-tetrafluoroethane and 1,3,3,3-tetrafluoropropene; or
  a mixture of 2,3,3,4,4,4-hexafluorobut-1-ene, 1,1,2,2-tetrafluoroethane and 1,1,1-trifluoropropane.

According to one embodiment, the difference between the liquid saturation pressure and the vapor saturation pressure at a temperature of −5° C. is less than or equal to 10% of the liquid saturation pressure.

According to one embodiment, the composition is non-flammable.

The invention also relates to the use of the abovementioned composition as a heat-transfer fluid.

The invention also relates to a heat-transfer composition, comprising the abovementioned composition as heat-transfer fluid, and also to one or more additives chosen from lubricants, stabilizers, surfactants, tracers, fluorescers, odorant agents and solubilizers, and mixtures thereof.

The invention also relates to a heat-transfer installation comprising a vapor compression circuit containing a composition as described above as heat-transfer fluid or containing a heat-transfer composition as described above.

According to one embodiment, the installation is chosen from mobile or stationary heat-pump heating, air-conditioning, refrigeration, freezing and Rankine cycle installations, and is preferably a container refrigeration installation.

The invention also relates to a process for heating or cooling a fluid or a body by means of a vapor compression circuit containing a heat-transfer fluid, the said process comprising, successively, evaporation of the heat-transfer fluid, compression of the heat-transfer fluid, condensation of the heat fluid and depressurization of the heat-transfer fluid, in which the heat-transfer fluid is a composition as described above.

According to one embodiment, this process is a process for cooling a fluid or a body, in which the temperature of the cooled fluid or body is from −15° C. to 15° C., preferably from −10° C. to 10° C. and more particularly preferably from −5° C. to 5° C.; or is a process for heating a fluid or a body, in which the temperature of the heated fluid or body is from 30° C. to 90° C., preferably from 35° C. to 60° C. and more particularly preferably from 40° C. to 50° C.

The invention also relates to a process for reducing the environmental impact of a heat-transfer installation comprising a vapor compression circuit containing an initial heat-transfer fluid, the said process comprising a step of replacing the initial heat-transfer fluid in the vapor compression circuit with a final transfer fluid, the final transfer fluid having a GWP lower than that of the initial heat-transfer fluid, in which the final heat-transfer fluid is a composition as described above.

The present invention makes it possible to overcome the drawbacks of the prior art. It more particularly provides low-GWP heat-transfer fluids, which can replace the usual heat-transfer fluids.

In particular, in certain embodiments, the invention provides quasi-azeotropic heat-transfer fluids. In certain embodiments, the invention provides heat-transfer fluids which have good energy performance qualities (especially volumetric capacity and/or coefficient of performance) when compared with usual heat-transfer fluids and/or which have improved energy performance qualities when compared with the known low-GWP heat-transfer fluids.

This is accomplished by means of mixtures comprising, firstly, HFO-1336yf, and, secondly, at least one hydrocarbon, hydrofluorocarbon or fluoroolefin compound with a boiling point of less than or equal to 0° C. and preferably less than or equal to −10° C., which is chosen in particular from the list of compounds mentioned above.

Mixtures comprising compounds with a low boiling point have an improved volumetric capacity when compared with HFO-1336yf alone. The increase in the volumetric capacity of a composition allows the use of compressors with a smaller swept volume, and consequently a smaller size.

DESCRIPTION OF EMBODIMENTS OF THE INVENTION

The invention is now described in greater detail and in a nonlimiting manner in the description that follows.

The main compounds used in the context of the invention are noted as follows:

2,3,3,4,4,4-hexafluorobut-1-ene: HFO-1336yf;
1,3,3,3-tetrafluoropropene: HFO-1234ze;
2,3,3,3-tetrafluoropropene: HFO-1234yf;
1,1,3,3-tetrafluoropropene: HFO-1234zc;
3,3,3-trifluoropropene: HFO-1243zf;
2,3,3-trifluoropropene: HFO-1243yf;
1,1,1,2-tetrafluoroethane: HFC-134a;
1,1,2,2-tetrafluoroethane: HFC-134;
pentafluoroethane: HFC-125;
1,1,1,2,3,3,3-heptafluoropropane: HFC-227ea;
1,1-difluoroethane: HFC-152a;
1,1,1-trifluoropropane: HFC-263fb;
propane: HC-290;
isobutane: HC-600a.

Unless otherwise mentioned, throughout the patent application, the proportions of compounds indicated are given as mass percentages.

HFO-1234ze may be in cis or trans form or may be a mixture of these two forms. Preferably, it is in trans form (E).

According to the present patent application, the global warming potential (GWP) is defined relative to carbon dioxide and relative to a duration of 100 years, according to the method indicated in "The scientific assessment of ozone depletion, 2002, a report of the World Meteorological Association's Global Ozone Research and Monitoring Project".

The term "heat-transfer compound" or, respectively, "heat-transfer fluid" (or cold-generating fluid) means a compound or, respectively, a fluid that is capable of absorbing heat by evaporating at low temperature and low pressure and of expelling heat by condensing at high temperature and high pressure, in a vapor compression circuit. In general, a heat-transfer fluid may comprise one, two, three or more than three heat-transfer compounds.

The term "heat-transfer composition" means a composition comprising a heat-transfer fluid and optionally one or more additives that are not heat-transfer compounds for the intended application.

The additives may be chosen especially from lubricants, nanoparticles, stabilizers, surfactants, tracers, fluorescers, odorant agents and solubilizers.

The stabilizer(s), when they are present, preferably represent not more than 5% by mass in the heat-transfer composition. Among the stabilizers, mention may be made especially of nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methylphenol, epoxides (optionally fluorinated or perfluorinated alkyl or alkenyl or aromatic) such as n-butyl glycidyl ether, hexanediol diglycidyl ether, allyl glycidyl ether, butylphenylglycidyl ether, phosphites, phosphonates, thiols and lactones.

Lubricants that may especially be used include oils of mineral origin, silicone oils, paraffins of natural origin, naphthenes, synthetic paraffins, alkylbenzenes, poly-α-olefins, polyalkene glycols, polyol esters and/or polyvinyl ethers.

Nanoparticles that may especially be used include carbon nanoparticles, metal oxides (of copper or aluminum), $TiO_2$, $Al_2O_3$, $MoS_2$, etc.

As tracers (which can be detected), mention may be made of deuterated or non-deuterated hydrofluorocarbons, deuterated hydrocarbons, perfluorocarbons, fluoroethers, brominated compounds, iodinated compounds, alcohols, aldehydes, ketones, nitrous oxide and combinations thereof. The tracer is different from the heat-transfer compound(s) of which the heat-transfer fluid is composed.

Solubilizers that may be mentioned include hydrocarbons, dimethyl ether, polyoxyalkylene ethers, amides, ketones, nitriles, chlorocarbons, esters, lactones, aryl ethers, fluoroethers and 1,1,1-trifluoroalkanes. The solubilizer is different from the heat-transfer compound(s) of which the heat-transfer fluid is composed.

Fluorescers that may be mentioned include naphthalimides, perylenes, coumarins, anthracenes, phenanthracenes, xanthenes, thioxanthenes, naphthoxanthenes, fluoresceins and derivatives and combinations thereof.

Odorous agents that may be mentioned include alkyl acrylates, allyl acrylates, acrylic acids, acryl esters, alkyl ethers, alkyl esters, alkynes, aldehydes, thiols, thioethers, disulfides, allyl isothiocyanates, alkanoic acids, amines, norbornenes, norbornene derivatives, cyclohexene, heterocyclic aromatic compounds, ascaridole, o-methoxy(methyl) phenol and combinations thereof.

The heat-transfer process according to the invention is based on the use of an installation comprising a vapor compression circuit which contains a heat-transfer fluid. The heat-transfer process may be a process of heating or cooling a fluid or a body.

The vapor compression circuit containing a heat-transfer fluid comprises at least one evaporator, a compressor, a condenser and a depressurizer, and also lines for transporting heat-transfer fluid between these elements. The evaporator and the condenser comprise a heat exchanger for exchanging heat between the heat-transfer fluid and another fluid or body.

Compressors that may especially be used include a centrifugal compressor with one or more stages or a mini centrifugal compressor. Rotary, spiral, piston or screw compressors may also be used. The compressor may be driven by an electric motor or by a gas turbine (for example fed with the exhaust gas from a vehicle, for mobile applications) or by gearing.

The installation may comprise a turbine for generating electricity (Rankine cycle).

The installation may optionally also comprise at least one heat-transfer fluid used to transmit heat (with or without a change of state) between the heat-transfer fluid circuit and the fluid or body to be heated or cooled.

The installation may also optionally comprise two (or more) vapor compression circuits, containing identical or different heat-transfer fluids. For example, the vapor compression circuits may be coupled together.

The vapor compression circuit functions according to a standard vapor compression cycle. The cycle comprises the change of state of the heat-transfer fluid from a liquid phase (or liquid/vapor double phase) to a vapor phase at relatively low pressure, and then the compression of the fluid in the vapor phase up to a relatively high pressure, the change of state (condensation) of the heat-transfer fluid from the vapor phase to the liquid phase at a relatively high pressure, and the reduction of the pressure to recommence the cycle.

In the case of a cooling process, heat derived from the fluid or body that is being cooled (directly or indirectly, via a heat-transfer fluid) is absorbed by the heat-transfer fluid, during its evaporation, and at a relatively low temperature relative to the environment. The cooling processes comprise air-conditioning (with mobile installations, for example in vehicles, or stationary installations), refrigeration (with mobile installations, for example in containers, or stationary installations) and freezing or cryogenic processes.

In the case of a heating process, heat is surrendered (directly or indirectly, via a heat-transfer fluid) from the heat-transfer fluid, during its condensation, to the fluid or body that is heated, at a relatively high temperature relative to the environment. The installation for performing the heat transfer is referred to in this case as a "heat pump".

It is possible to use any type of heat exchanger for the use of the heat-transfer fluids according to the invention, and especially co-current heat exchangers or, preferably, counter-current heat exchangers.

The heat-transfer fluids used in the context of the present invention are compositions which comprise HFO-1336yf in combination with at least one hydrocarbon, ether, hydrofluoroether, hydrofluorocarbon or fluoroolefin compound (preferably a hydrofluorocarbon, hydrocarbon or fluoroolefin compound) with a boiling point of less than or equal to −10° C. at a pressure of 101.325 kPa.

The boiling point may be measured according to standard NF EN 378-1 of April 2008.

Preferably, the compound is chosen from HFO-1234yf, HFO-1234ze, HFO-1234zc, HFO-1243zf, HFO-1243yf, HFC-134a, HFC-134, HFC-125, HFC-227ea, HFC-152a, HFC-263fb, HC-290 and HC-600a.

HFO-1234ze, HFO-1234yf, HFC-134a, HFC-134, HFC-263fb and HFC-152a are preferred among these compounds.

The normal boiling points at 1 bar of these compounds are as follows, to within 0.5° C.:

HFO-1234ze: −18.5° C.;
HFO-1234yf: −29.5° C.;
HFC-134a: −26° C.;
HFC-134: −17.5° C.;
HFC-263fb: −13.0° C.;
HFC-152a: −24.0° C.

In particular, the above compositions may be binary or ternary mixtures of compounds.

Binary mixtures are mixtures of two heat-transfer compounds. Ternary mixtures are mixtures of three heat-transfer compounds.

Impurities may or may not be present in such heat-transfer fluids. When they are present, they represent less than 1%, preferably less than 0.5%, preferably less than 0.1%, preferably less than 0.05% and preferably less than 0.01% of the composition.

In the case of the ternary mixtures, the heat-transfer fluid may comprise HFO-1336yf in combination with two compounds chosen from HFO-1234yf, HFO-1234ze, HFO-1234zc, HFO-1243zf, HFO-1243yf, HFC-134a, HFC-134, HFC-125, HFC-227ea, HFC-152a, HFC-263fb HC-290 and HC-600a; or alternatively HFO-1336yf in combination with a compound chosen from HFO-1234yf, HFO-1234ze, HFO-1234zc, HFO-1243zf, HFO-1243yf, HFC-134a, HFC-134, HFC-125, HFC-227ea, HFC-152a, HFC-263fb, HC-290 and HC-600a and also an additional compound, preferably chosen from hydrocarbons, hydrochlorofluorocarbons, hydrofluorocarbons, hydrofluoroethers, ethers (of hydrocarbons), fluoroolefins, ammonia and carbon dioxide.

In the above compositions, the HFO-1336yf may represent from 0.1% to 1% of the composition or from 1% to 2% of the composition; or from 2% to 3% of the composition; or from 3% to 4% of the composition; or from 4% to 5% of the composition; or from 5% to 6% of the composition; or from 6% to 7% of the composition; or from 7% to 8% of the composition; or from 8% to 9% of the composition; or from 9% to 10% of the composition; or from 10% to 11% of the composition; or from 11% to 12% of the composition; or from 12% to 13% of the composition; or from 13% to 14% of the composition; or from 14% to 15% of the composition; or from 15% to 16% of the composition; or from 16% to 17% of the composition; or from 17% to 18% of the composition; or from 18% to 19% of the composition; or from 19% to 20% of the composition; or from 20% to 21% of the composition; or from 21% to 22% of the composition; or from 22% to 23% of the composition; or from 23% to 24% of the composition; or from 24% to 25% of the composition; or from 25% to 26% of the composition; or from 26% to 27% of the composition; or from 27% to 28% of the composition; or from 28% to 29% of the composition; or from 29% to 30% of the composition; or from 30% to 31% of the composition; or from 31% to 32% of the composition; or from 32% to 33% of the composition; or from 33% to 34% of the composition; or from 34% to 35% of the composition; or from 35% to 36% of the composition; or from 36% to 37% of the composition; or from 37% to 38% of the composition; or from 38% to 39% of the composition; or from 39% to 40% of the composition; or from 40% to 41% of the composition; or from 41% to 42% of the composition; or from 42% to 43% of the composition; or from 43% to 44% of the composition; or from 44% to 45% of the composition; or from 45% to 46% of the composition; or from 46% to 47% of the composition; or from 47% to 48% of the composition; or from 48% to 49% of the composition; or from 49% to 50% of the composition; or from 50% to 51% of the composition; or from 51% to 52% of the composition; or from 52% to 53% of the composition; or from 53% to 54% of the composition; or from 54% to 55% of the composition; or from 55% to 56% of the composition; or from 56% to 57% of the composition; or from 57% to 58% of the composition; or from 58% to 59% of the composition; or from 59% to 60% of the composition; or from 60% to 61% of the composition; or from 61% to 62% of the composition; or from 62% to 63% of the composition; or from 63% to 64% of the composition; or from 64% to 65% of the composition; or from 65% to 66% of the composition; or from 66% to 67% of the composition; or from 67% to 68% of the composition; or from 68% to 69% of the composition; or from 69% to 70% of the composition; or from 70% to 71% of the composition; or from 71% to 72% of the composition; or from 72% to 73% of the composition; or from 73% to 74% of the composition; or from 74% to 75% of the composition; or from 75% to 76% of the composition; or from 76% to 77% of the composition; or from 77% to 78% of the composition; or from 78% to 79% of the composition; or from 79% to 80% of the composition; or from 80% to 81% of the composition; or from 81% to 82% of the composition; or from 82% to 83% of the composition; or from 83% to 84% of the composition; or from 84% to 85% of the composition; or from 85% to 86% of the composition; or from 86% to 87% of the composition; or from 87% to 88% of the composition; or from 88% to 89% of the composition; or from 89% to 90% of the composition; or from 90% to 91% of the composition; or from 91% to 92% of the composition; or from 92% to 93% of the composition; or from 93% to 94% of the composition; or from 94% to 95% of the composition; or from 95% to 96% of the composition; or from 96% to 97% of the composition; or from 97% to 98% of the composition; or from 98% to 99% of the composition; or from 99% to 99.9% of the composition. The content of HFO-1336yf may also vary within several of the above intervals: for example from 1% to 2% and from 2% to 3%, i.e. starting from 1% to 3%, etc.

Furthermore, in the above compositions, the or each hydrocarbon, ether, hydrofluoroether, hydrofluorocarbon or fluoroolefin compound with a boiling point of less than or equal to −10° C. may represent from 0.1% to 1% of the composition; or from 1% to 2% of the composition; or from 2% to 3% of the composition; or from 3% to 4% of the composition; or from 4% to 5% of the composition; or from 5% to 6% of the composition; or from 6% to 7% of the composition; or from 7% to 8% of the composition; or from 8% to 9% of the composition; or from 9% to 10% of the composition; or from 10% to 11% of the composition; or from 11% to 12% of the composition; or from 12% to 13% of the composition; or from 13% to 14% of the composition; or from 14% to 15% of the composition; or from 15% to 16% of the composition; or from 16% to 17% of the composition; or from 17% to 18% of the composition; or from 18% to 19% of the composition; or from 19% to 20% of the composition; or from 20% to 21% of the composition; or from 21% to 22% of the composition; or from 22% to 23% of the composition; or from 23% to 24% of the composition; or from 24% to 25% of the composition; or from 25% to 26% of the composition; or from 26% to 27% of the composition; or from 27% to 28% of the composition; or from 28% to 29% of the composition; or from 29% to 30% of the composition; or from 30% to 31% of the composition; or from 31% to 32% of the composition; or from 32% to 33% of the composition; or from 33% to 34% of the composition; or from 34% to 35% of the composition; or from 35% to 36% of the composition; or from 36% to 37% of the composition; or from 37% to 38% of the composition; or from 38% to 39% of the composition; or from 39% to 40% of the composition; or from 40% to 41% of the composition; or from 41% to 42% of the composition; or from 42% to 43% of the composition; or from 43% to 44% of the composition; or from 44% to 45% of the composition; or from 45% to 46% of the composition; or from 46% to 47% of the composition; or from 47% to 48% of the composition; or from 48% to 49% of the composition; or from 49% to 50% of the composition; or from 50% to 51% of the composition; or from 51% to 52% of the composition; or from 52% to 53% of the composition; or from 53% to 54% of the composition; or from 54% to 55% of the composition; or from 55% to 56% of the composition; or from 56% to 57% of the composition; or from 57% to 58% of the composition; or from 58% to 59% of the composition; or from 59% to 60% of the composition; or from 60% to 61% of the composition; or from 61% to 62% of the composition; or from 62% to 63% of the composition; or from 63% to 64% of the composition; or from 64% to 65% of the composition; or from 65% to 66% of the composition; or from 66% to 67% of the composition; or from 67% to 68% of the composition; or from 68% to 69% of the composition; or from 69% to 70% of the composition; or from 70% to 71% of the composition; or from 71% to 72% of the composition; or from 72% to 73% of the composition; or from 73% to 74% of the composition; or from 74% to 75% of the composition; or from 75% to 76% of the composition; or from 76% to 77% of the composition; or from 77% to 78% of the composition; or from 78% to 79% of the composition; or from 79% to 80% of the composition; or from 80% to 81% of the composition; or from 81% to 82% of the composition; or from 82% to 83% of the composition; or from 83% to 84% of the composition; or from 84% to 85% of the composition; or from 85% to 86% of the composition; or from 86% to 87% of the composition; or from 87% to 88% of the composition; or from 88% to 89% of the composition; or from 89% to 90% of the composition; or from 90% to 91% of the composition; or from 91% to 92% of the composition; or from 92% to 93% of the composition; or from 93% to 94% of the composition; or from 94% to 95% of the composition; or from 95% to 96% of the composition; or from 96% to 97% of the composition; or from 97% to 98% of the composition; or from 98% to 99% of the composition; or from 99% to 99.9% of the composition. The content of the compound or of each compound may also vary within several of the above intervals: for example from 1% to 2% and from 2% to 3%, i.e. from 1% to 3%, etc.

Preferred compositions are:
the binary mixture of HFO-1336yf and HFO-1234ze (and especially HFO-E-1234ze);
the binary mixture of HFO-1336yf and HFC-263fb;
the binary mixture of HFO-1336yf and HFC-134;
the binary mixture of HFO-1336yf and HFC-134a;
the binary mixture of HFO-1336yf and HFC-152a;
the ternary mixture of HFO-1336yf, de HFC-134a and HFO-1234ze (especially HFO-E-1234ze);
the ternary mixture of HFO-1336yf, de HFC-134a and HFC-263fb;
the ternary mixture of HFO-1336yf, de HFC-134a and HFC-152a;
the ternary mixture of HFO-1336yf, de HFC-134 and HFO-1234ze (especially HFO-E-1234ze); et
the ternary mixture of HFO-1336yf, de HFC-134 and HFC-263fb.

In certain embodiments, the composition according to the invention has one of the formulations listed in the table below:

|  | HFO-1336yf | HFO-1234ze |
|---|---|---|
| Composition 1 | from 1% to 5% | from 95% to 99% |
| Composition 2 | from 5% to 10% | from 90% to 95% |
| Composition 3 | from 10% to 15% | from 85% to 90% |
| Composition 4 | from 15% to 20% | from 80% to 85% |
| Composition 5 | from 20% to 25% | from 75% to 80% |
| Composition 6 | from 25% to 30% | from 70% to 75% |
| Composition 7 | from 30% to 35% | from 65% to 70% |
| Composition 8 | from 35% to 40% | from 60% to 65% |
| Composition 9 | from 40% to 45% | from 55% to 60% |
| Composition 10 | from 45% to 50% | from 50% to 55% |
| Composition 11 | from 50% to 55% | from 45% to 50% |
| Composition 12 | from 55% to 60% | from 40% to 45% |
| Composition 13 | from 60% to 65% | from 35% to 40% |
| Composition 14 | from 65% to 70% | from 30% to 35% |
| Composition 15 | from 70% to 75% | from 25% to 30% |
| Composition 16 | from 75% to 80% | from 20% to 25% |
| Composition 17 | from 80% to 85% | from 15% to 20% |
| Composition 18 | from 85% to 90% | from 10% to 15% |
| Composition 19 | from 90% to 95% | from 5% to 10% |
| Composition 20 | from 95% to 99% | from 1% to 5% |

In certain embodiments, the composition according to the invention has one of the formulations listed in the table below:

|  | HFO-1336yf | HFC-263fb |
|---|---|---|
| Composition 1 | from 1% to 5% | from 95% to 99% |
| Composition 2 | from 5% to 10% | from 90% to 95% |
| Composition 3 | from 10% to 15% | from 85% to 90% |
| Composition 4 | from 15% to 20% | from 80% to 85% |
| Composition 5 | from 20% to 25% | from 75% to 80% |
| Composition 6 | from 25% to 30% | from 70% to 75% |
| Composition 7 | from 30% to 35% | from 65% to 70% |
| Composition 8 | from 35% to 40% | from 60% to 65% |
| Composition 9 | from 40% to 45% | from 55% to 60% |
| Composition 10 | from 45% to 50% | from 50% to 55% |
| Composition 11 | from 50% to 55% | from 45% to 50% |
| Composition 12 | from 55% to 60% | from 40% to 45% |
| Composition 13 | from 60% to 65% | from 35% to 40% |
| Composition 14 | from 65% to 70% | from 30% to 35% |
| Composition 15 | from 70% to 75% | from 25% to 30% |
| Composition 16 | from 75% to 80% | from 20% to 25% |
| Composition 17 | from 80% to 85% | from 15% to 20% |
| Composition 18 | from 85% to 90% | from 10% to 15% |
| Composition 19 | from 90% to 95% | from 5% to 10% |
| Composition 20 | from 95% to 99% | from 1% to 5% |

In certain embodiments, the composition according to the invention has one of the formulations listed in the table below:

|  | HFO-1336yf | HFC-134 |
|---|---|---|
| Composition 1 | from 1% to 5% | from 95% to 99% |
| Composition 2 | from 5% to 10% | from 90% to 95% |
| Composition 3 | from 10% to 15% | from 85% to 90% |
| Composition 4 | from 15% to 20% | from 80% to 85% |
| Composition 5 | from 20% to 25% | from 75% to 80% |
| Composition 6 | from 25% to 30% | from 70% to 75% |
| Composition 7 | from 30% to 35% | from 65% to 70% |
| Composition 8 | from 35% to 40% | from 60% to 65% |
| Composition 9 | from 40% to 45% | from 55% to 60% |
| Composition 10 | from 45% to 50% | from 50% to 55% |
| Composition 11 | from 50% to 55% | from 45% to 50% |
| Composition 12 | from 55% to 60% | from 40% to 45% |
| Composition 13 | from 60% to 65% | from 35% to 40% |
| Composition 14 | from 65% to 70% | from 30% to 35% |
| Composition 15 | from 70% to 75% | from 25% to 30% |
| Composition 16 | from 75% to 80% | from 20% to 25% |
| Composition 17 | from 80% to 85% | from 15% to 20% |
| Composition 18 | from 85% to 90% | from 10% to 15% |
| Composition 19 | from 90% to 95% | from 5% to 10% |
| Composition 20 | from 95% to 99% | from 1% to 5% |

In certain embodiments, the composition according to the invention has one of the formulations listed in the table below:

|  | HFO-1336yf | HFC-134a |
|---|---|---|
| Composition 1 | from 1% to 5% | from 95% to 99% |
| Composition 2 | from 5% to 10% | from 90% to 95% |
| Composition 3 | from 10% to 15% | from 85% to 90% |
| Composition 4 | from 15% to 20% | from 80% to 85% |
| Composition 5 | from 20% to 25% | from 75% to 80% |
| Composition 6 | from 25% to 30% | from 70% to 75% |
| Composition 7 | from 30% to 35% | from 65% to 70% |
| Composition 8 | from 35% to 40% | from 60% to 65% |
| Composition 9 | from 40% to 45% | from 55% to 60% |
| Composition 10 | from 45% to 50% | from 50% to 55% |
| Composition 11 | from 50% to 55% | from 45% to 50% |
| Composition 12 | from 55% to 60% | from 40% to 45% |
| Composition 13 | from 60% to 65% | from 35% to 40% |
| Composition 14 | from 65% to 70% | from 30% to 35% |
| Composition 15 | from 70% to 75% | from 25% to 30% |
| Composition 16 | from 75% to 80% | from 20% to 25% |
| Composition 17 | from 80% to 85% | from 15% to 20% |
| Composition 18 | from 85% to 90% | from 10% to 15% |
| Composition 19 | from 90% to 95% | from 5% to 10% |
| Composition 20 | from 95% to 99% | from 1% to 5% |

In certain embodiments, the composition according to the invention has one of the formulations listed in the table below:

|  | HFO-1336yf | HFC-152a |
| --- | --- | --- |
| Composition 1 | from 1% to 5% | from 95% to 99% |
| Composition 2 | from 5% to 10% | from 90% to 95% |
| Composition 3 | from 10% to 15% | from 85% to 90% |
| Composition 4 | from 15% to 20% | from 80% to 85% |
| Composition 5 | from 20% to 25% | from 75% to 80% |
| Composition 6 | from 25% to 30% | from 70% to 75% |
| Composition 7 | from 30% to 35% | from 65% to 70% |
| Composition 8 | from 35% to 40% | from 60% to 65% |
| Composition 9 | from 40% to 45% | from 55% to 60% |
| Composition 10 | from 45% to 50% | from 50% to 55% |
| Composition 11 | from 50% to 55% | from 45% to 50% |
| Composition 12 | from 55% to 60% | from 40% to 45% |
| Composition 13 | from 60% to 65% | from 35% to 40% |
| Composition 14 | from 65% to 70% | from 30% to 35% |
| Composition 15 | from 70% to 75% | from 25% to 30% |
| Composition 16 | from 75% to 80% | from 20% to 25% |
| Composition 17 | from 80% to 85% | from 15% to 20% |
| Composition 18 | from 85% to 90% | from 10% to 15% |
| Composition 19 | from 90% to 95% | from 5% to 10% |
| Composition 20 | from 95% to 99% | from 1% to 5% |

In certain embodiments, the composition according to the invention has one of the formulations listed in the table below:

|  | HFO-1336yf | HFC-134a | HFO-1234ze |
| --- | --- | --- | --- |
| Composition 1 | from 1% to 10% | from 1% to 10% | from 80% to 98% |
| Composition 2 | from 1% to 10% | from 10% to 20% | from 70% to 89% |
| Composition 3 | from 1% to 10% | from 20% to 30% | from 60% to 79% |
| Composition 4 | from 1% to 10% | from 30% to 40% | from 50% to 69% |
| Composition 5 | from 1% to 10% | from 40% to 50% | from 40% to 59% |
| Composition 6 | from 1% to 10% | from 50% to 60% | from 30% to 49% |
| Composition 7 | from 1% to 10% | from 60% to 70% | from 20% to 39% |
| Composition 8 | from 1% to 10% | from 70% to 80% | from 10% to 29% |
| Composition 9 | from 1% to 10% | from 80% to 90% | from 1% to 19% |
| Composition 10 | from 1% to 10% | from 90% to 98% | from 1% to 9% |
| Composition 11 | from 10% to 20% | from 1% to 10% | from 70% to 89% |
| Composition 12 | from 10% to 20% | from 10% to 20% | from 60% to 80% |
| Composition 13 | from 10% to 20% | from 20% to 30% | from 50% to 70% |
| Composition 14 | from 10% to 20% | from 30% to 40% | from 40% to 60% |
| Composition 15 | from 10% to 20% | from 40% to 50% | from 30% to 50% |
| Composition 16 | from 10% to 20% | from 50% to 60% | from 20% to 40% |
| Composition 17 | from 10% to 20% | from 60% to 70% | from 10% to 30% |
| Composition 18 | from 10% to 20% | from 70% to 80% | from 1% to 20% |
| Composition 19 | from 10% to 20% | from 80% to 90% | from 1% to 10% |
| Composition 20 | from 20% to 30% | from 1% to 10% | from 60% to 79% |
| Composition 21 | from 20% to 30% | from 10% to 20% | from 50% to 70% |
| Composition 22 | from 20% to 30% | from 20% to 30% | from 40% to 60% |
| Composition 23 | from 20% to 30% | from 30% to 40% | from 30% to 50% |
| Composition 24 | from 20% to 30% | from 40% to 50% | from 20% to 40% |
| Composition 25 | from 20% to 30% | from 50% to 60% | from 10% to 30% |
| Composition 26 | from 20% to 30% | from 60% to 70% | from 1% to 20% |
| Composition 27 | from 20% to 30% | from 70% to 80% | from 1% to 10% |
| Composition 28 | from 30% to 40% | from 1% to 10% | from 50% to 69% |
| Composition 29 | from 30% to 40% | from 10% to 20% | from 40% to 60% |
| Composition 30 | from 30% to 40% | from 20% to 30% | from 30% to 50% |
| Composition 31 | from 30% to 40% | from 30% to 40% | from 20% to 40% |
| Composition 32 | from 30% to 40% | from 40% to 50% | from 10% to 30% |
| Composition 33 | from 30% to 40% | from 50% to 60% | from 1% to 20% |
| Composition 34 | from 30% to 40% | from 60% to 70% | from 1% to 10% |
| Composition 35 | from 40% to 50% | from 1% to 10% | from 40% to 59% |
| Composition 36 | from 40% to 50% | from 10% to 20% | from 30% to 50% |
| Composition 37 | from 40% to 50% | from 20% to 30% | from 20% to 40% |
| Composition 38 | from 40% to 50% | from 30% to 40% | from 10% to 30% |
| Composition 39 | from 40% to 50% | from 40% to 50% | from 1% to 20% |
| Composition 40 | from 40% to 50% | from 50% to 60% | from 1% to 10% |
| Composition 41 | from 50% to 60% | from 1% to 10% | from 30% to 49% |
| Composition 42 | from 50% to 60% | from 10% to 20% | from 20% to 40% |
| Composition 43 | from 50% to 60% | from 20% to 30% | from 10% to 30% |
| Composition 44 | from 50% to 60% | from 30% to 40% | from 1% to 20% |
| Composition 45 | from 50% to 60% | from 40% to 50% | from 1% to 10% |
| Composition 46 | from 60% to 70% | from 1% to 10% | from 20% to 39% |
| Composition 47 | from 60% to 70% | from 10% to 20% | from 10% to 30% |
| Composition 48 | from 60% to 70% | from 20% to 30% | from 1% to 20% |
| Composition 49 | from 60% to 70% | from 30% to 40% | from 1% to 10% |
| Composition 50 | from 70% to 80% | from 1% to 10% | from 10% to 29% |
| Composition 51 | from 70% to 80% | from 10% to 20% | from 1% to 20% |
| Composition 52 | from 70% to 80% | from 20% to 30% | from 1% to 10% |
| Composition 53 | from 80% to 90% | from 1% to 10% | from 1% to 19% |
| Composition 54 | from 80% to 90% | from 10% to 20% | from 1% to 10% |
| Composition 55 | from 90% to 98% | from 1% to 9% | from 1% to 9% |

In certain embodiments, the composition according to the invention has one of the formulations listed in the table below:

|  | HFO-1336yf | HFC-134a | HFC-263fb |
|---|---|---|---|
| Composition 1 | from 1% to 10% | from 1% to 10% | from 80% to 98% |
| Composition 2 | from 1% to 10% | from 10% to 20% | from 70% to 89% |
| Composition 3 | from 1% to 10% | from 20% to 30% | from 60% to 79% |
| Composition 4 | from 1% to 10% | from 30% to 40% | from 50% to 69% |
| Composition 5 | from 1% to 10% | from 40% to 50% | from 40% to 59% |
| Composition 6 | from 1% to 10% | from 50% to 60% | from 30% to 49% |
| Composition 7 | from 1% to 10% | from 60% to 70% | from 20% to 39% |
| Composition 8 | from 1% to 10% | from 70% to 80% | from 10% to 29% |
| Composition 9 | from 1% to 10% | from 80% to 90% | from 1% to 19% |
| Composition 10 | from 1% to 10% | from 90% to 98% | from 1% to 9% |
| Composition 11 | from 10% to 20% | from 1% to 10% | from 70% to 89% |
| Composition 12 | from 10% to 20% | from 10% to 20% | from 60% to 80% |
| Composition 13 | from 10% to 20% | from 20% to 30% | from 50% to 70% |
| Composition 14 | from 10% to 20% | from 30% to 40% | from 40% to 60% |
| Composition 15 | from 10% to 20% | from 40% to 50% | from 30% to 50% |
| Composition 16 | from 10% to 20% | from 50% to 60% | from 20% to 40% |
| Composition 17 | from 10% to 20% | from 60% to 70% | from 10% to 30% |
| Composition 18 | from 10% to 20% | from 70% to 80% | from 1% to 20% |
| Composition 19 | from 10% to 20% | from 80% to 90% | from 1% to 10% |
| Composition 20 | from 20% to 30% | from 1% to 10% | from 60% to 79% |
| Composition 21 | from 20% to 30% | from 10% to 20% | from 50% to 70% |
| Composition 22 | from 20% to 30% | from 20% to 30% | from 40% to 60% |
| Composition 23 | from 20% to 30% | from 30% to 40% | from 30% to 50% |
| Composition 24 | from 20% to 30% | from 40% to 50% | from 20% to 40% |
| Composition 25 | from 20% to 30% | from 50% to 60% | from 10% to 30% |
| Composition 26 | from 20% to 30% | from 60% to 70% | from 1% to 20% |
| Composition 27 | from 20% to 30% | from 70% to 80% | from 1% to 10% |
| Composition 28 | from 30% to 40% | from 1% to 10% | from 50% to 69% |
| Composition 29 | from 30% to 40% | from 10% to 20% | from 40% to 60% |
| Composition 30 | from 30% to 40% | from 20% to 30% | from 30% to 50% |
| Composition 31 | from 30% to 40% | from 30% to 40% | from 20% to 40% |
| Composition 32 | from 30% to 40% | from 40% to 50% | from 10% to 30% |
| Composition 33 | from 30% to 40% | from 50% to 60% | from 1% to 20% |
| Composition 34 | from 30% to 40% | from 60% to 70% | from 1% to 10% |
| Composition 35 | from 40% to 50% | from 1% to 10% | from 40% to 59% |
| Composition 36 | from 40% to 50% | from 10% to 20% | from 30% to 50% |
| Composition 37 | from 40% to 50% | from 20% to 30% | from 20% to 40% |
| Composition 38 | from 40% to 50% | from 30% to 40% | from 10% to 30% |
| Composition 39 | from 40% to 50% | from 40% to 50% | from 1% to 20% |
| Composition 40 | from 40% to 50% | from 50% to 60% | from 1% to 10% |
| Composition 41 | from 50% to 60% | from 1% to 10% | from 30% to 49% |
| Composition 42 | from 50% to 60% | from 10% to 20% | from 20% to 40% |
| Composition 43 | from 50% to 60% | from 20% to 30% | from 10% to 30% |
| Composition 44 | from 50% to 60% | from 30% to 40% | from 1% to 20% |
| Composition 45 | from 50% to 60% | from 40% to 50% | from 1% to 10% |
| Composition 46 | from 60% to 70% | from 1% to 10% | from 20% to 39% |
| Composition 47 | from 60% to 70% | from 10% to 20% | from 10% to 30% |
| Composition 48 | from 60% to 70% | from 20% to 30% | from 1% to 20% |
| Composition 49 | from 60% to 70% | from 30% to 40% | from 1% to 10% |
| Composition 50 | from 70% to 80% | from 1% to 10% | from 10% to 29% |
| Composition 51 | from 70% to 80% | from 10% to 20% | from 1% to 20% |
| Composition 52 | from 70% to 80% | from 20% to 30% | from 1% to 10% |
| Composition 53 | from 80% to 90% | from 1% to 10% | from 1% to 19% |
| Composition 54 | from 80% to 90% | from 10% to 20% | from 1% to 10% |
| Composition 55 | from 90% to 98% | from 1% to 9% | from 1% to 9% |

In certain embodiments, the composition according to the invention has one of the formulations listed in the table below:

|  | HFO-1336yf | HFC-134a | HFC-152a |
|---|---|---|---|
| Composition 1 | from 1% to 10% | from 1% to 10% | from 80% to 98% |
| Composition 2 | from 1% to 10% | from 10% to 20% | from 70% to 89% |
| Composition 3 | from 1% to 10% | from 20% to 30% | from 60% to 79% |
| Composition 4 | from 1% to 10% | from 30% to 40% | from 50% to 69% |
| Composition 5 | from 1% to 10% | from 40% to 50% | from 40% to 59% |
| Composition 6 | from 1% to 10% | from 50% to 60% | from 30% to 49% |
| Composition 7 | from 1% to 10% | from 60% to 70% | from 20% to 39% |
| Composition 8 | from 1% to 10% | from 70% to 80% | from 10% to 29% |
| Composition 9 | from 1% to 10% | from 80% to 90% | from 1% to 19% |

-continued

|  | HFO-1336yf | HFC-134a | HFC-152a |
|---|---|---|---|
| Composition 10 | from 1% to 10% | from 90% to 98% | from 1% to 9% |
| Composition 11 | from 10% to 20% | from 1% to 10% | from 70% to 89% |
| Composition 12 | from 10% to 20% | from 10% to 20% | from 60% to 80% |
| Composition 13 | from 10% to 20% | from 20% to 30% | from 50% to 70% |
| Composition 14 | from 10% to 20% | from 30% to 40% | from 40% to 60% |
| Composition 15 | from 10% to 20% | from 40% to 50% | from 30% to 50% |
| Composition 16 | from 10% to 20% | from 50% to 60% | from 20% to 40% |
| Composition 17 | from 10% to 20% | from 60% to 70% | from 10% to 30% |
| Composition 18 | from 10% to 20% | from 70% to 80% | from 1% to 20% |
| Composition 19 | from 10% to 20% | from 80% to 90% | from 1% to 10% |
| Composition 20 | from 20% to 30% | from 1% to 10% | from 60% to 79% |
| Composition 21 | from 20% to 30% | from 10% to 20% | from 50% to 70% |
| Composition 22 | from 20% to 30% | from 20% to 30% | from 40% to 60% |
| Composition 23 | from 20% to 30% | from 30% to 40% | from 30% to 50% |
| Composition 24 | from 20% to 30% | from 40% to 50% | from 20% to 40% |
| Composition 25 | from 20% to 30% | from 50% to 60% | from 10% to 30% |
| Composition 26 | from 20% to 30% | from 60% to 70% | from 1% to 20% |
| Composition 27 | from 20% to 30% | from 70% to 80% | from 1% to 10% |
| Composition 28 | from 30% to 40% | from 1% to 10% | from 50% to 69% |
| Composition 29 | from 30% to 40% | from 10% to 20% | from 40% to 60% |
| Composition 30 | from 30% to 40% | from 20% to 30% | from 30% to 50% |
| Composition 31 | from 30% to 40% | from 30% to 40% | from 20% to 40% |
| Composition 32 | from 30% to 40% | from 40% to 50% | from 10% to 30% |
| Composition 33 | from 30% to 40% | from 50% to 60% | from 1% to 20% |
| Composition 34 | from 30% to 40% | from 60% to 70% | from 1% to 10% |
| Composition 35 | from 40% to 50% | from 1% to 10% | from 40% to 59% |
| Composition 36 | from 40% to 50% | from 10% to 20% | from 30% to 50% |
| Composition 37 | from 40% to 50% | from 20% to 30% | from 20% to 40% |
| Composition 38 | from 40% to 50% | from 30% to 40% | from 10% to 30% |
| Composition 39 | from 40% to 50% | from 40% to 50% | from 1% to 20% |
| Composition 40 | from 40% to 50% | from 50% to 60% | from 1% to 10% |
| Composition 41 | from 50% to 60% | from 1% to 10% | from 30% to 49% |
| Composition 42 | from 50% to 60% | from 10% to 20% | from 20% to 40% |
| Composition 43 | from 50% to 60% | from 20% to 30% | from 10% to 30% |
| Composition 44 | from 50% to 60% | from 30% to 40% | from 1% to 20% |
| Composition 45 | from 50% to 60% | from 40% to 50% | from 1% to 10% |
| Composition 46 | from 60% to 70% | from 1% to 10% | from 20% to 39% |
| Composition 47 | from 60% to 70% | from 10% to 20% | from 10% to 30% |
| Composition 48 | from 60% to 70% | from 20% to 30% | from 1% to 20% |
| Composition 49 | from 60% to 70% | from 30% to 40% | from 1% to 10% |
| Composition 50 | from 70% to 80% | from 1% to 10% | from 10% to 29% |
| Composition 51 | from 70% to 80% | from 10% to 20% | from 1% to 20% |
| Composition 52 | from 70% to 80% | from 20% to 30% | from 1% to 10% |
| Composition 53 | from 80% to 90% | from 1% to 10% | from 1% to 19% |
| Composition 54 | from 80% to 90% | from 10% to 20% | from 1% to 10% |
| Composition 55 | from 90% to 98% | from 1% to 9% | from 1% to 9% |

In certain embodiments, the composition according to the invention has one of the formulations listed in the table below:

|  | HFO-1336yf | HFC-134 | HFO-1234ze |
|---|---|---|---|
| Composition 1 | from 1% to 10% | from 1% to 10% | from 80% to 98% |
| Composition 2 | from 1% to 10% | from 10% to 20% | from 70% to 89% |
| Composition 3 | from 1% to 10% | from 20% to 30% | from 60% to 79% |
| Composition 4 | from 1% to 10% | from 30% to 40% | from 50% to 69% |
| Composition 5 | from 1% to 10% | from 40% to 50% | from 40% to 59% |
| Composition 6 | from 1% to 10% | from 50% to 60% | from 30% to 49% |
| Composition 7 | from 1% to 10% | from 60% to 70% | from 20% to 39% |
| Composition 8 | from 1% to 10% | from 70% to 80% | from 10% to 29% |
| Composition 9 | from 1% to 10% | from 80% to 90% | from 1% to 19% |
| Composition 10 | from 1% to 10% | from 90% to 98% | from 1% to 9% |
| Composition 11 | from 10% to 20% | from 1% to 10% | from 70% to 89% |
| Composition 12 | from 10% to 20% | from 10% to 20% | from 60% to 80% |
| Composition 13 | from 10% to 20% | from 20% to 30% | from 50% to 70% |
| Composition 14 | from 10% to 20% | from 30% to 40% | from 40% to 60% |
| Composition 15 | from 10% to 20% | from 40% to 50% | from 30% to 50% |
| Composition 16 | from 10% to 20% | from 50% to 60% | from 20% to 40% |
| Composition 17 | from 10% to 20% | from 60% to 70% | from 10% to 30% |
| Composition 18 | from 10% to 20% | from 70% to 80% | from 1% to 20% |
| Composition 19 | from 10% to 20% | from 80% to 90% | from 1% to 10% |
| Composition 20 | from 20% to 30% | from 1% to 10% | from 60% to 79% |
| Composition 21 | from 20% to 30% | from 10% to 20% | from 50% to 70% |

-continued

|  | HFO-1336yf | HFC-134 | HFO-1234ze |
|---|---|---|---|
| Composition 22 | from 20% to 30% | from 20% to 30% | from 40% to 60% |
| Composition 23 | from 20% to 30% | from 30% to 40% | from 30% to 50% |
| Composition 24 | from 20% to 30% | from 40% to 50% | from 20% to 40% |
| Composition 25 | from 20% to 30% | from 50% to 60% | from 10% to 30% |
| Composition 26 | from 20% to 30% | from 60% to 70% | from 1% to 20% |
| Composition 27 | from 20% to 30% | from 70% to 80% | from 1% to 10% |
| Composition 28 | from 30% to 40% | from 1% to 10% | from 50% to 69% |
| Composition 29 | from 30% to 40% | from 10% to 20% | from 40% to 60% |
| Composition 30 | from 30% to 40% | from 20% to 30% | from 30% to 50% |
| Composition 31 | from 30% to 40% | from 30% to 40% | from 20% to 40% |
| Composition 32 | from 30% to 40% | from 40% to 50% | from 10% to 30% |
| Composition 33 | from 30% to 40% | from 50% to 60% | from 1% to 20% |
| Composition 34 | from 30% to 40% | from 60% to 70% | from 1% to 10% |
| Composition 35 | from 40% to 50% | from 1% to 10% | from 40% to 59% |
| Composition 36 | from 40% to 50% | from 10% to 20% | from 30% to 50% |
| Composition 37 | from 40% to 50% | from 20% to 30% | from 20% to 40% |
| Composition 38 | from 40% to 50% | from 30% to 40% | from 10% to 30% |
| Composition 39 | from 40% to 50% | from 40% to 50% | from 1% to 20% |
| Composition 40 | from 40% to 50% | from 50% to 60% | from 1% to 10% |
| Composition 41 | from 50% to 60% | from 1% to 10% | from 30% to 49% |
| Composition 42 | from 50% to 60% | from 10% to 20% | from 20% to 40% |
| Composition 43 | from 50% to 60% | from 20% to 30% | from 10% to 30% |
| Composition 44 | from 50% to 60% | from 30% to 40% | from 1% to 20% |
| Composition 45 | from 50% to 60% | from 40% to 50% | from 1% to 10% |
| Composition 46 | from 60% to 70% | from 1% to 10% | from 20% to 39% |
| Composition 47 | from 60% to 70% | from 10% to 20% | from 10% to 30% |
| Composition 48 | from 60% to 70% | from 20% to 30% | from 1% to 20% |
| Composition 49 | from 60% to 70% | from 30% to 40% | from 1% to 10% |
| Composition 50 | from 70% to 80% | from 1% to 10% | from 10% to 29% |
| Composition 51 | from 70% to 80% | from 10% to 20% | from 1% to 20% |
| Composition 52 | from 70% to 80% | from 20% to 30% | from 1% to 10% |
| Composition 53 | from 80% to 90% | from 1% to 10% | from 1% to 19% |
| Composition 54 | from 80% to 90% | from 10% to 20% | from 1% to 10% |
| Composition 55 | from 90% to 98% | from 1% to 9% | from 1% to 9% |

In certain embodiments, the composition according to the invention has one of the formulations listed in the table below:

|  | HFO-1336yf | HFC-134 | HFC-263fb |
|---|---|---|---|
| Composition 1 | from 1% to 10% | from 1% to 10% | from 80% to 98% |
| Composition 2 | from 1% to 10% | from 10% to 20% | from 70% to 89% |
| Composition 3 | from 1% to 10% | from 20% to 30% | from 60% to 79% |
| Composition 4 | from 1% to 10% | from 30% to 40% | from 50% to 69% |
| Composition 5 | from 1% to 10% | from 40% to 50% | from 40% to 59% |
| Composition 6 | from 1% to 10% | from 50% to 60% | from 30% to 49% |
| Composition 7 | from 1% to 10% | from 60% to 70% | from 20% to 39% |
| Composition 8 | from 1% to 10% | from 70% to 80% | from 10% to 29% |
| Composition 9 | from 1% to 10% | from 80% to 90% | from 1% to 19% |
| Composition 10 | from 1% to 10% | from 90% to 98% | from 1% to 9% |
| Composition 11 | from 10% to 20% | from 1% to 10% | from 70% to 89% |
| Composition 12 | from 10% to 20% | from 10% to 20% | from 60% to 80% |
| Composition 13 | from 10% to 20% | from 20% to 30% | from 50% to 70% |
| Composition 14 | from 10% to 20% | from 30% to 40% | from 40% to 60% |
| Composition 15 | from 10% to 20% | from 40% to 50% | from 30% to 50% |
| Composition 16 | from 10% to 20% | from 50% to 60% | from 20% to 40% |
| Composition 17 | from 10% to 20% | from 60% to 70% | from 10% to 30% |
| Composition 18 | from 10% to 20% | from 70% to 80% | from 1% to 20% |
| Composition 19 | from 10% to 20% | from 80% to 90% | from 1% to 10% |
| Composition 20 | from 20% to 30% | from 1% to 10% | from 60% to 79% |
| Composition 21 | from 20% to 30% | from 10% to 20% | from 50% to 70% |
| Composition 22 | from 20% to 30% | from 20% to 30% | from 40% to 60% |
| Composition 23 | from 20% to 30% | from 30% to 40% | from 30% to 50% |
| Composition 24 | from 20% to 30% | from 40% to 50% | from 20% to 40% |
| Composition 25 | from 20% to 30% | from 50% to 60% | from 10% to 30% |
| Composition 26 | from 20% to 30% | from 60% to 70% | from 1% to 20% |
| Composition 27 | from 20% to 30% | from 70% to 80% | from 1% to 10% |
| Composition 28 | from 30% to 40% | from 1% to 10% | from 50% to 69% |
| Composition 29 | from 30% to 40% | from 10% to 20% | from 40% to 60% |
| Composition 30 | from 30% to 40% | from 20% to 30% | from 30% to 50% |
| Composition 31 | from 30% to 40% | from 30% to 40% | from 20% to 40% |
| Composition 32 | from 30% to 40% | from 40% to 50% | from 10% to 30% |
| Composition 33 | from 30% to 40% | from 50% to 60% | from 1% to 20% |

-continued

| | HFO-1336yf | HFC-134 | HFC-263fb |
|---|---|---|---|
| Composition 34 | from 30% to 40% | from 60% to 70% | from 1% to 10% |
| Composition 35 | from 40% to 50% | from 1% to 10% | from 40% to 59% |
| Composition 36 | from 40% to 50% | from 10% to 20% | from 30% to 50% |
| Composition 37 | from 40% to 50% | from 20% to 30% | from 20% to 40% |
| Composition 38 | from 40% to 50% | from 30% to 40% | from 10% to 30% |
| Composition 39 | from 40% to 50% | from 40% to 50% | from 1% to 20% |
| Composition 40 | from 40% to 50% | from 50% to 60% | from 1% to 10% |
| Composition 41 | from 50% to 60% | from 1% to 10% | from 30% to 49% |
| Composition 42 | from 50% to 60% | from 10% to 20% | from 20% to 40% |
| Composition 43 | from 50% to 60% | from 20% to 30% | from 10% to 30% |
| Composition 44 | from 50% to 60% | from 30% to 40% | from 1% to 20% |
| Composition 45 | from 50% to 60% | from 40% to 50% | from 1% to 10% |
| Composition 46 | from 60% to 70% | from 1% to 10% | from 20% to 39% |
| Composition 47 | from 60% to 70% | from 10% to 20% | from 10% to 30% |
| Composition 48 | from 60% to 70% | from 20% to 30% | from 1% to 20% |
| Composition 49 | from 60% to 70% | from 30% to 40% | from 1% to 10% |
| Composition 50 | from 70% to 80% | from 1% to 10% | from 10% to 29% |
| Composition 51 | from 70% to 80% | from 10% to 20% | from 1% to 20% |
| Composition 52 | from 70% to 80% | from 20% to 30% | from 1% to 10% |
| Composition 53 | from 80% to 90% | from 1% to 10% | from 1% to 19% |
| Composition 54 | from 80% to 90% | from 10% to 20% | from 1% to 10% |
| Composition 55 | from 90% to 98% | from 1% to 9% | from 1% to 9% |

Among the above compositions, some of them have the advantage of being quasi-azeotropic.

The term "quasi-azeotropic" denotes compositions for which, at constant temperature, the liquid saturation pressure and the vapor saturation pressure are virtually identical (the maximum pressure difference being 10%, or even advantageously 5%, relative to the liquid saturation pressure). These heat-transfer fluids have an advantage of ease of use. In the absence of a significant temperature glide, there is no significant change in the circulating composition, nor any significant change in the composition in the case of leakage.

Some of the compositions of the invention are quasi-azeotropic at a reference temperature of −5° C.

Some of the compositions of the invention are inflammable, within the meaning of standard ASHRAE 34-2007, and preferably with a test temperature of 60° C. instead of 100° C.

Some of the compositions of the invention have performance qualities that are equivalent and/or improved relative to a reference heat-transfer fluid, for example HFO-1234ze or HC-600a.

These performance qualities may especially be the volumetric capacity and/or the coefficient of performance.

The equivalent or improved performance qualities may especially be checked for the moderate-temperature cooling processes, i.e. those in which the temperature of the cooled fluid or body is from −15° C. to 15° C., preferably from −10° C. to 10° C. and more particularly preferably from −5° C. to 5° C. (ideally about 0° C.).

The equivalent or improved performance qualities may alternatively be checked for moderate-temperature heating processes, i.e. those in which the temperature of the heated fluid or body is from 30° C. to 80° C., preferably from 35° C. to 55° C. and more particularly preferably from 40° C. to 50° C. (ideally about 45° C.).

In the "moderate-temperature cooling or heating" processes mentioned above, the inlet temperature of the heat-transfer fluid to the evaporator is preferably from −20° C. to 10° C., especially from −15° C. to 5° C. and more particularly preferably from −10° C. to 0° C., for example about −5° C.; and the condensation-start temperature of the heat-transfer fluid in the condenser is preferably from 25° C. to 90° C., especially from 30° C. to 70° C. and more particularly preferably from 35° C. to 55° C., for example about 50° C. These processes may be refrigeration, air-conditioning or heating processes.

The equivalent or improved performance qualities may alternatively be checked for low-temperature refrigeration processes, i.e. those in which the temperature of the cooled fluid or body is from −40° C. to −10° C., preferably from −35° C. to −25° C. and more particularly preferably from −30° C. to −20° C. (ideally about −25° C.).

In the "low-temperature refrigeration" processes mentioned above, the inlet temperature of the heat-transfer fluid to the evaporator is preferably from −45° C. to −15° C., especially from −40° C. to −20° C. and more particularly preferably from −35° C. to −25° C., for example about −30° C.; and the condensation-start temperature of the heat-transfer fluid in the condenser is preferably from 25° C. to 80° C., especially from 30° C. to 60° C. and more particularly preferably from 35° C. to 55° C., for example about 40° C.

Some compositions of the invention are also particularly advantageous for high-temperature heating processes, i.e. those in which the temperature of the heated fluid or body is greater than 90° C., for example greater than or equal to 110° C. or greater than or equal to 130° C., and preferably less than or equal to 170° C.

Some compositions of the invention are also particularly advantageous for refrigerated transportation applications and especially refrigerated containers.

The compositions according to the invention may serve to replace various heat-transfer fluids in various heat-transfer applications. For example, the compositions according to the invention may serve to replace:

1,1,1,2-tetrafluoroethane (R134a);
    1,1-difluoroethane (R152a);
    1,1,1,3,3-pentafluoropropane (R245fa);
    mixtures of pentafluoroethane (R125), 1,1,1,2-tetrafluoroethane (R134a) and isobutane (R600a), namely R422;
    chlorodifluoromethane (R22);
    the mixture of 51.2% chloropentafluoroethane (R115) and 48.8% chlorodifluoromethane (R22), namely R502;
    any hydrocarbon;

the mixture of 20% difluoromethane (R32), 40% pentafluoroethane (R125) and 40% 1,1,1,2-tetrafluoroethane (R134a), namely R407A;

the mixture of 23% difluoromethane (R32), 25% pentafluoroethane (R125) and 52% 1,1,1,2-tetrafluoroethane (R134a), namely R407C;

the mixture of 30% difluoromethane (R32), 30% pentafluoroethane (R125) and 40% 1,1,1,2-tetrafluoroethane (R134a), namely R407F;

the mixture of 44% pentafluoroethane (R125), 52% 1,1,1-trifluoroethane (R143a) and 4% 1,1,1,2-tetrafluoroethane (R134a), namely R404A;

R1234yf (2,3,3,3-tetrafluoropropene);

R1234ze (1,3,3,3-tetrafluoropropene).

The compositions according to the invention may also be useful as expansion agents, propellants (for example for an aerosol), cleaning agents or solvents, besides their use as heat-transfer fluids.

As propellants, the compositions according to the invention may be used alone or in combination with known propellants. The propellant comprises, and preferably consists of, a composition according to the invention. The active substance that is to be sprayed may be mixed with the propellant and inert compounds, solvents or other additives, to form a composition to be sprayed. Preferably, the composition to be sprayed is an aerosol.

As expansion agent, the compositions according to the invention may be included in an expansion composition, which preferably comprises one or more other compounds that are capable of reacting and of forming a foam or cellular structure under suitable conditions, as is known to those skilled in the art.

In particular, the invention proposes a process for preparing an expanded thermoplastic product, first comprising the preparation of a polymeric expansion composition. Typically, the polymeric expansion composition is prepared by plasticizing a polymeric resin and by mixing the compounds of an expansion agent composition at an initial pressure. The plasticization of the polymer resin may be performed under the effect of heat, by heating the polymer resin to soften it sufficiently to mix an expansion agent composition. Generally, the plasticization temperature is close to the glass transition temperature or the melting point for crystalline polymers.

Other uses of the compositions according to the invention comprise uses as solvents, cleaning agents or the like. Examples that may be mentioned include steam degreasing, precision cleaning, the cleaning of electronic circuits, dry cleaning, abrasive cleaning, solvents for depositing lubricants and release agents, and other solvent or surface treatments.

Example 1—Method for Calculating the Properties of the Heat-Transfer Fluids in the Various Configurations Envisaged The RK-Soave equation is used for calculating the densities, enthalpies, entropies and liquid/vapor equilibrium data for the mixtures. The use of this equation requires knowledge of the properties of the pure substances used in the mixtures under consideration and also the coefficients of interaction for each binary mixture.

The data available for each pure substance are the boiling point, the critical temperature and the critical pressure, the pressure curve as a function of the temperature from the boiling point up to the critical point, the saturated liquid density and saturated vapor density as a function of the temperature.

The data regarding HFCs are published in the ASHRAE Handbook 2005, chapter 20, and are also available under Refrop (software developed by NIST for calculating the properties of cold-generating fluids).

The data of the temperature-pressure curve for HFOs are measured via the static method. The critical temperature and the critical pressure are measured with a C80 calorimeter sold by Setaram.

The RK-Soave equation uses coefficients of binary interaction to represent the behavior of the products as mixtures. The coefficients are calculated as a function of the experimental liquid/vapor equilibrium data.

The technique used for the liquid/vapor equilibrium measurements is the static analytical cell method. The equilibrium cell comprises a sapphire tube and is equipped with two electromagnetic ROLSITM samplers. It is immersed in a cryothermostatic bath (Huber HS40). A field-driven magnetic stirrer rotating at variable speed is used to accelerate the establishment of the equilibria. The samples are analyzed by gas chromatography (HP5890 series II) using a catharometer (TCD).

The liquid/vapor equilibrium measurements on the HFC-134/HFO-1234ze binary mixture are performed on the following isotherm: 20° C.

The liquid/vapor equilibrium measurements on the HFC-134/HFC-263fb binary mixture are performed on the following isotherm: 30° C.

The liquid/vapor equilibrium measurements on the HFC-134/HFO-1336yf binary mixture are performed for the following isotherm: 50° C.

The liquid/vapor equilibrium measurements on the HFC-134a/HFO-1234ze binary mixture are performed for the following isotherm: 20° C.

The liquid/vapor equilibrium measurements on the HFC-134a/HFC-263fb binary mixture are performed for the following isotherm: 30° C.

The liquid/vapor equilibrium measurements on the HFC-134a/HFO-1336yf binary mixture are performed for the following isotherm: 50° C.

The liquid/vapor equilibrium measurements on the HFC-134a/HFO-1234yf binary mixture are performed for the following isotherm: 20° C.

The liquid/vapor equilibrium measurements on the HFO-1234ze/HFC-263fb binary mixture are performed for the following isotherm: 30° C.

The liquid/vapor equilibrium measurements on the HFO-1234ze/HFO-1336yf binary mixture are performed for the following isotherm: 50° C.

The liquid/vapor equilibrium measurements on the HFO-1234ze/HFO-1234yf binary mixture are performed for the following isotherm: 18° C.

The liquid/vapor equilibrium measurements on the HFO-1234yf/HFO-1336yf binary mixture are performed for the following isotherm: 50° C.

The liquid/vapor equilibrium measurements on the HFO-1336yf/HFC-263fb binary mixture are performed for the following isotherm: 50° C.

To evaluate the energy performance qualities, a compression system equipped with an evaporator and countercurrent condenser, a screw compressor and a depressurizer are considered.

The system functions with 5° C. of overheating. The evaporation temperature is −5° C. and the condensation temperature is 50° C.

The coefficient of performance (COP) is defined as being the working power provided by the system over the power supplied or consumed by the system.

The Lorenz coefficient of performance (COPLorenz) is a reference coefficient of performance. It is temperature dependent and is used to compare the COPs of the different fluids.

The Lorenz coefficient of performance is defined as follows (the temperatures T are in K):

$$T_{condenser}^{mean} = T_{condenser}^{inlet} - T_{condenser}^{outlet}$$

$$T_{evaporator}^{mean} = T_{evaporator}^{inlet} - T_{evaporator}^{inlet}$$

The Lorenz COP in the case of conditioned air and refrigeration is:

$$COPlorenz = \frac{T_{evaporator}^{mean}}{T_{condenser}^{mean} - T_{evaporator}^{mean}}$$

The Lorenz COP in the case of heating is:

$$COPlorenz = \frac{T_{condenser}^{mean}}{T_{condenser}^{mean} - T_{evaporator}^{mean}}$$

For each composition, the coefficient of performance of the Lorenz cycle is calculated as a function of the corresponding temperatures.

In the tables that follow, "Temp (° C.)" denotes the temperature, "P sat liquid" denotes the saturating liquid pressure, "P sat vapor" denotes the saturating vapor pressure, "pressure diff. (%)" denotes the ratio of the difference between the saturating liquid pressure and the saturating vapor pressure, over the saturating liquid pressure (as a %), "Temp evap outlet" denotes the temperature of the fluid at the evaporator outlet, "Temp comp outlet" denotes the temperature of the fluid at the compressor outlet, "T cond outlet" denotes the temperature of the fluid at the condenser outlet, "Temp depress inlet" denotes the temperature of the fluid at the depressurizer inlet, "evap P (bar)" denotes the pressure of the fluid in the evaporator, "cond P (bar)" denotes the pressure of the fluid in the condenser, "Rate (p/p)" denotes the compression rate, "Glide" denotes the temperature glide, "% CAP" denotes the volumetric capacity of the fluid relative to the reference fluid indicated on the first line, "% COP/COPLorenz" denotes the ratio of the COP for the system relative to the COP for the corresponding Lorenz cycle.

Example 2—Data for the Quasi-Azeotropic Mixtures

HFO-1336yf/HFO-E-1234ze Mixture:

| HFO-1234ze | HFO-1336yf | Temp, (° C.) | P sat liq (bar) | P sat vap (bar) | % pressure diff |
|---|---|---|---|---|---|
| 65 | 35 | −4 | 1.5 | 1.3 | 10.8 |
| 70 | 30 | −4 | 1.5 | 1.4 | 9.4 |
| 75 | 25 | −4 | 1.6 | 1.4 | 8.0 |
| 80 | 20 | −4 | 1.6 | 1.5 | 6.4 |
| 85 | 15 | −5 | 1.6 | 1.6 | 4.8 |

-continued

| HFO-1234ze | HFO-1336yf | Temp, (° C.) | P sat liq (bar) | P sat vap (bar) | % pressure diff |
|---|---|---|---|---|---|
| 90 | 10 | −5 | 1.7 | 1.6 | 3.2 |
| 95 | 5 | −5 | 1.7 | 1.7 | 1.5 |

HFO-1336yf/HFC-134 Mixture:

| HFC-134 | HFO-1336yf | Temp, (° C.) | P sat liq (bar) | P sat vap (bar) | % pressure diff |
|---|---|---|---|---|---|
| 60 | 40 | −4 | 1.6 | 1.4 | 10.8 |
| 65 | 35 | −4 | 1.6 | 1.5 | 8.7 |
| 70 | 30 | −4 | 1.7 | 1.6 | 6.7 |
| 75 | 25 | −5 | 1.7 | 1.6 | 5.0 |
| 80 | 20 | −5 | 1.8 | 1.7 | 3.5 |
| 85 | 15 | −5 | 1.8 | 1.8 | 2.3 |
| 90 | 10 | −5 | 1.8 | 1.8 | 1.3 |
| 95 | 5 | −5 | 1.9 | 1.8 | 0.6 |

HFO-1336yf/HFC-134a Mixture:

| HFC-134a | HFO-1336yf | Temp, (° C.) | P sat liq (bar) | P sat vap (bar) | % pressure diff |
|---|---|---|---|---|---|
| 80 | 20 | −4 | 2.1 | 1.9 | 9.9 |
| 85 | 15 | −4 | 2.2 | 2.1 | 7.4 |
| 90 | 10 | −4 | 2.3 | 2.2 | 5.0 |
| 95 | 5 | −5 | 2.4 | 2.3 | 2.5 |

HFO-1336yf/HFC-263fb Mixture:

| HFO-1336yf | HFC-263fb | Temp, (° C.) | P sat liq (bar) | P sat vap (bar) | % pressure diff |
|---|---|---|---|---|---|
| 95 | 5 | −5 | 0.8 | 0.8 | 4.4 |
| 90 | 10 | −5 | 0.9 | 0.8 | 7.1 |
| 85 | 15 | −5 | 1.0 | 0.9 | 8.7 |
| 80 | 20 | −4 | 1.0 | 0.9 | 9.7 |
| 75 | 25 | −4 | 1.1 | 0.9 | 10.1 |
| 70 | 30 | −4 | 1.1 | 1.0 | 10.1 |
| 65 | 35 | −4 | 1.1 | 1.0 | 9.9 |
| 60 | 40 | −4 | 1.2 | 1.1 | 9.4 |
| 55 | 45 | −4 | 1.2 | 1.1 | 8.8 |
| 50 | 50 | −4 | 1.2 | 1.1 | 8.0 |
| 45 | 55 | −4 | 1.3 | 1.2 | 7.1 |
| 40 | 60 | −4 | 1.3 | 1.2 | 6.2 |
| 35 | 65 | −5 | 1.3 | 1.2 | 5.3 |
| 30 | 70 | −5 | 1.3 | 1.3 | 4.3 |
| 25 | 75 | −5 | 1.4 | 1.3 | 3.4 |
| 20 | 80 | −5 | 1.4 | 1.3 | 2.6 |
| 15 | 85 | −5 | 1.4 | 1.4 | 1.8 |
| 10 | 90 | −5 | 1.4 | 1.4 | 1.1 |
| 5 | 95 | −5 | 1.4 | 1.4 | 0.5 |

HFO-1336yf/HFO-1234yf Mixture:

| HFO-1234yf | HFO-1336yf | Temp, (° C.) | P sat liq (bar) | P sat vap (bar) | % pressure diff |
|---|---|---|---|---|---|
| 90 | 10 | −4 | 2.4 | 2.2 | 8.7 |
| 95 | 5 | −4 | 2.5 | 2.4 | 4.5 |

HFO-1336yf/HFO-E-1234ze/HFC-134 Mixture:

| HFO-1234ze | HFC-134 | HFO-1336yf | Temp, (° C.) | P sat liq (bar) | P sat vap (bar) | % pressure diff |
|---|---|---|---|---|---|---|
| 5 | 60 | 35 | −4 | 1.6 | 1.5 | 9.3 |
| 5 | 65 | 30 | −4 | 1.7 | 1.6 | 7.2 |
| 5 | 70 | 25 | −4 | 1.7 | 1.6 | 5.4 |
| 5 | 75 | 20 | −5 | 1.8 | 1.7 | 3.7 |
| 5 | 80 | 15 | −5 | 1.8 | 1.8 | 2.4 |
| 5 | 85 | 10 | −5 | 1.8 | 1.8 | 1.3 |
| 5 | 90 | 5 | −5 | 1.9 | 1.8 | 0.6 |
| 15 | 50 | 35 | −4 | 1.6 | 1.5 | 10.5 |
| 15 | 55 | 30 | −4 | 1.7 | 1.5 | 8.3 |
| 15 | 60 | 25 | −4 | 1.7 | 1.6 | 6.2 |
| 15 | 65 | 20 | −5 | 1.8 | 1.7 | 4.3 |
| 15 | 70 | 15 | −5 | 1.8 | 1.7 | 2.7 |
| 15 | 75 | 10 | −5 | 1.8 | 1.8 | 1.5 |
| 15 | 80 | 5 | −5 | 1.9 | 1.8 | 0.6 |
| 25 | 45 | 30 | −4 | 1.7 | 1.5 | 9.3 |
| 25 | 50 | 25 | −4 | 1.7 | 1.6 | 7.1 |
| 25 | 55 | 20 | −5 | 1.8 | 1.7 | 5.0 |
| 25 | 60 | 15 | −5 | 1.8 | 1.7 | 3.2 |
| 25 | 65 | 10 | −5 | 1.8 | 1.8 | 1.7 |
| 25 | 70 | 5 | −5 | 1.9 | 1.8 | 0.7 |
| 35 | 35 | 30 | −4 | 1.6 | 1.5 | 10.0 |
| 35 | 40 | 25 | −4 | 1.7 | 1.6 | 7.9 |
| 35 | 45 | 20 | −4 | 1.7 | 1.6 | 5.8 |
| 35 | 50 | 15 | −5 | 1.8 | 1.7 | 3.8 |
| 35 | 55 | 10 | −5 | 1.8 | 1.8 | 2.1 |
| 35 | 60 | 5 | −5 | 1.8 | 1.8 | 0.9 |
| 45 | 25 | 30 | −4 | 1.6 | 1.4 | 10.2 |
| 45 | 30 | 25 | −4 | 1.7 | 1.5 | 8.4 |
| 45 | 35 | 20 | −4 | 1.7 | 1.6 | 6.4 |
| 45 | 40 | 15 | −5 | 1.8 | 1.7 | 4.5 |
| 45 | 45 | 10 | −5 | 1.8 | 1.8 | 2.6 |
| 45 | 50 | 5 | −5 | 1.8 | 1.8 | 1.1 |
| 55 | 15 | 30 | −4 | 1.6 | 1.4 | 10.0 |
| 55 | 20 | 25 | −4 | 1.6 | 1.5 | 8.5 |
| 55 | 25 | 20 | −4 | 1.7 | 1.6 | 6.8 |
| 55 | 30 | 15 | −5 | 1.7 | 1.6 | 4.9 |
| 55 | 35 | 10 | −5 | 1.8 | 1.7 | 3.1 |
| 55 | 40 | 5 | −5 | 1.8 | 1.8 | 1.4 |
| 65 | 5 | 30 | −4 | 1.5 | 1.4 | 9.6 |
| 65 | 10 | 25 | −4 | 1.6 | 1.5 | 8.2 |
| 65 | 15 | 20 | −4 | 1.6 | 1.5 | 6.7 |
| 65 | 20 | 15 | −5 | 1.7 | 1.6 | 5.1 |
| 65 | 25 | 10 | −5 | 1.8 | 1.7 | 3.3 |
| 65 | 30 | 5 | −5 | 1.8 | 1.8 | 1.7 |
| 75 | 5 | 20 | −4 | 1.6 | 1.5 | 6.5 |
| 75 | 10 | 15 | −5 | 1.7 | 1.6 | 5.0 |
| 75 | 15 | 10 | −5 | 1.7 | 1.7 | 3.4 |
| 75 | 20 | 5 | −5 | 1.8 | 1.8 | 1.7 |
| 85 | 5 | 10 | −5 | 1.7 | 1.6 | 3.2 |
| 85 | 10 | 5 | −5 | 1.8 | 1.7 | 1.7 |
| 90 | 5 | 5 | −5 | 1.7 | 1.7 | 1.6 |

HFO-1336yf/HFO-E-1234ze/HFC-134a Mixture:

| HFC-134a | HFO-1234ze | HFO-1336yf | Temp, (° C.) | P sat liq (bar) | P sat vap (bar) | % pressure diff |
|---|---|---|---|---|---|---|
| 75 | 5 | 20 | −4 | 2.1 | 1.9 | 9.9 |
| 80 | 5 | 15 | −4 | 2.2 | 2.0 | 7.4 |
| 85 | 5 | 10 | −4 | 2.3 | 2.2 | 5.0 |
| 90 | 5 | 5 | −5 | 2.3 | 2.3 | 2.6 |
| 65 | 15 | 20 | −4 | 2.1 | 1.9 | 10.2 |
| 75 | 15 | 10 | −4 | 2.2 | 2.1 | 5.2 |
| 80 | 15 | 5 | −5 | 2.3 | 2.2 | 2.9 |
| 55 | 25 | 20 | −4 | 2.0 | 1.8 | 10.7 |
| 65 | 25 | 10 | −4 | 2.2 | 2.1 | 5.7 |
| 70 | 25 | 5 | −5 | 2.3 | 2.2 | 3.4 |
| 55 | 35 | 10 | −4 | 2.1 | 2.0 | 6.3 |
| 60 | 35 | 5 | −5 | 2.2 | 2.1 | 4.0 |
| 45 | 45 | 10 | −4 | 2.1 | 1.9 | 6.8 |
| 50 | 45 | 5 | −5 | 2.1 | 2.0 | 4.5 |
| 25 | 55 | 20 | −4 | 1.8 | 1.6 | 10.7 |
| 35 | 55 | 10 | −4 | 2.0 | 1.8 | 7.0 |
| 40 | 55 | 5 | −5 | 2.1 | 2.0 | 4.8 |
| 5 | 65 | 30 | −4 | 1.6 | 1.4 | 10.9 |
| 15 | 65 | 20 | −4 | 1.7 | 1.6 | 9.6 |
| 25 | 65 | 10 | −4 | 1.9 | 1.8 | 6.7 |
| 30 | 65 | 5 | −5 | 2.0 | 1.9 | 4.8 |
| 5 | 75 | 20 | −4 | 1.7 | 1.5 | 7.7 |
| 10 | 75 | 15 | −4 | 1.7 | 1.6 | 7.0 |
| 15 | 75 | 10 | −4 | 1.8 | 1.7 | 5.9 |
| 20 | 75 | 5 | −5 | 1.9 | 1.8 | 4.4 |
| 5 | 85 | 10 | −5 | 1.7 | 1.7 | 4.3 |
| 10 | 85 | 5 | −5 | 1.8 | 1.8 | 3.4 |
| 5 | 90 | 5 | −5 | 1.8 | 1.7 | 2.6 |

HFO-1336yf/HFO-E-1234ze/HFC-263fb Mixture:

| HFO-1234ze | HFO-1336yf | HFC-263fb | Temp, (° C.) | P sat liq (bar) | P sat vap (bar) | % pressure diff |
|---|---|---|---|---|---|---|
| 5 | 90 | 5 | −5 | 0.9 | 0.8 | 8.2 |
| 5 | 60 | 35 | −4 | 1.2 | 1.1 | 10.4 |
| 5 | 50 | 45 | −4 | 1.2 | 1.1 | 8.9 |
| 5 | 40 | 55 | −4 | 1.3 | 1.2 | 7.0 |
| 5 | 30 | 65 | −5 | 1.4 | 1.3 | 5.0 |
| 5 | 20 | 75 | −5 | 1.4 | 1.4 | 3.1 |
| 5 | 10 | 85 | −5 | 1.5 | 1.4 | 1.4 |
| 15 | 40 | 45 | −4 | 1.3 | 1.2 | 8.4 |
| 15 | 30 | 55 | −4 | 1.4 | 1.3 | 6.1 |
| 15 | 20 | 65 | −5 | 1.4 | 1.4 | 3.9 |
| 15 | 10 | 75 | −5 | 1.5 | 1.5 | 2.1 |
| 15 | 5 | 80 | −5 | 1.5 | 1.5 | 1.3 |
| 25 | 40 | 35 | −4 | 1.4 | 1.2 | 9.6 |
| 25 | 30 | 45 | −4 | 1.4 | 1.3 | 7.1 |
| 25 | 20 | 55 | −5 | 1.5 | 1.4 | 4.6 |
| 25 | 10 | 65 | −5 | 1.5 | 1.5 | 2.5 |
| 25 | 5 | 70 | −5 | 1.5 | 1.5 | 1.6 |
| 35 | 30 | 35 | −4 | 1.4 | 1.3 | 7.9 |
| 35 | 20 | 45 | −5 | 1.5 | 1.4 | 5.2 |
| 35 | 10 | 55 | −5 | 1.5 | 1.5 | 2.8 |
| 35 | 5 | 60 | −5 | 1.6 | 1.5 | 1.8 |
| 45 | 30 | 25 | −4 | 1.5 | 1.3 | 8.5 |
| 45 | 20 | 35 | −5 | 1.5 | 1.4 | 5.6 |
| 45 | 10 | 45 | −5 | 1.6 | 1.5 | 3.0 |
| 45 | 5 | 50 | −5 | 1.6 | 1.6 | 1.9 |
| 55 | 30 | 15 | −4 | 1.5 | 1.4 | 9.0 |
| 55 | 20 | 25 | −4 | 1.6 | 1.5 | 5.9 |
| 55 | 10 | 35 | −5 | 1.6 | 1.6 | 3.0 |
| 55 | 5 | 40 | −5 | 1.6 | 1.6 | 1.8 |
| 65 | 30 | 5 | −4 | 1.5 | 1.4 | 9.3 |
| 65 | 20 | 15 | −4 | 1.6 | 1.5 | 6.2 |
| 65 | 10 | 25 | −5 | 1.6 | 1.6 | 3.1 |
| 65 | 5 | 30 | −5 | 1.7 | 1.6 | 1.7 |
| 75 | 20 | 5 | −4 | 1.6 | 1.5 | 6.4 |
| 75 | 10 | 15 | −5 | 1.7 | 1.6 | 3.1 |
| 75 | 5 | 20 | −5 | 1.7 | 1.7 | 1.6 |
| 85 | 10 | 5 | −5 | 1.7 | 1.6 | 3.1 |
| 85 | 5 | 10 | −5 | 1.7 | 1.7 | 1.6 |
| 90 | 5 | 5 | −5 | 1.7 | 1.7 | 1.5 |

HFO-1336yf/HFO-E-1234ze/HFO-1234yf Mixture:

| HFO-1234yf | HFO-1234ze | HFO-1336yf | Temp, (° C.) | P sat liq (bar) | P sat vap (bar) | % pressure diff |
|---|---|---|---|---|---|---|
| 85 | 5 | 10 | −4 | 2.4 | 2.2 | 8.7 |
| 75 | 15 | 10 | −4 | 2.3 | 2.1 | 9.0 |
| 80 | 15 | 5 | −4 | 2.4 | 2.3 | 5.1 |
| 65 | 25 | 10 | −4 | 2.3 | 2.1 | 9.3 |
| 70 | 25 | 5 | −4 | 2.4 | 2.2 | 5.7 |
| 45 | 45 | 10 | −4 | 2.1 | 1.9 | 9.6 |
| 50 | 45 | 5 | −4 | 2.2 | 2.1 | 6.8 |
| 35 | 55 | 10 | −4 | 2.0 | 1.8 | 9.3 |

-continued

| HFO-1234yf | HFO-1234ze | HFO-1336yf | Temp, (° C.) | P sat liq (bar) | P sat vap (bar) | % pressure diff |
|---|---|---|---|---|---|---|
| 40 | 55 | 5 | −4 | 2.1 | 2.0 | 6.9 |
| 15 | 65 | 20 | −4 | 1.8 | 1.6 | 11.0 |
| 25 | 65 | 10 | −4 | 1.9 | 1.8 | 8.5 |
| 30 | 65 | 5 | −4 | 2.0 | 1.9 | 6.6 |
| 5 | 75 | 20 | −4 | 1.7 | 1.5 | 8.2 |
| 15 | 75 | 10 | −4 | 1.8 | 1.7 | 7.0 |
| 20 | 75 | 5 | −5 | 1.9 | 1.8 | 5.7 |
| 5 | 85 | 10 | −5 | 1.7 | 1.7 | 4.7 |
| 10 | 85 | 5 | −5 | 1.8 | 1.8 | 4.1 |
| 5 | 90 | 5 | −5 | 1.8 | 1.7 | 3.0 |

HFO-1336yf/HFO-1234yf/HFC-134a Mixture:

| HFO-1234yf | HFC-134a | HFO-1336yf | Temp, (° C.) | P sat liq (bar) | P sat vap (bar) | % pressure diff |
|---|---|---|---|---|---|---|
| 85 | 5 | 10 | −4 | 2.4 | 2.2 | 9.1 |
| 90 | 5 | 5 | −4 | 2.5 | 2.4 | 4.9 |
| 75 | 15 | 10 | −4 | 2.5 | 2.2 | 9.4 |
| 80 | 15 | 5 | −4 | 2.6 | 2.4 | 5.1 |
| 65 | 25 | 10 | −4 | 2.5 | 2.3 | 9.3 |
| 70 | 25 | 5 | −4 | 2.6 | 2.5 | 5.0 |
| 55 | 35 | 10 | −4 | 2.5 | 2.3 | 8.9 |
| 60 | 35 | 5 | −4 | 2.6 | 2.5 | 4.8 |
| 45 | 45 | 10 | −4 | 2.5 | 2.3 | 8.4 |
| 50 | 45 | 5 | −4 | 2.6 | 2.5 | 4.6 |
| 35 | 55 | 10 | −4 | 2.5 | 2.3 | 8.0 |
| 40 | 55 | 5 | −5 | 2.6 | 2.5 | 4.4 |
| 25 | 65 | 10 | −4 | 2.4 | 2.3 | 7.4 |
| 30 | 65 | 5 | −5 | 2.5 | 2.4 | 4.3 |
| 5 | 75 | 20 | −4 | 2.2 | 1.9 | 10.9 |
| 15 | 75 | 10 | −4 | 2.4 | 2.2 | 6.7 |
| 20 | 75 | 5 | −5 | 2.5 | 2.4 | 4.0 |
| 5 | 85 | 10 | −4 | 2.3 | 2.2 | 5.7 |
| 10 | 85 | 5 | −5 | 2.4 | 2.3 | 3.5 |
| 5 | 90 | 5 | −5 | 2.4 | 2.3 | 3.1 |

HFO-1336yf/HFC-134/HFC-263fb Mixture:

| HFC-134 | HFO-1336yf | HFC-263fb | Temp, (° C.) | P sat liq (bar) | P sat vap (bar) | % pressure diff |
|---|---|---|---|---|---|---|
| 5 | 50 | 45 | −4 | 1.3 | 1.1 | 9.8 |
| 5 | 40 | 55 | −4 | 1.3 | 1.2 | 7.7 |
| 5 | 30 | 65 | −5 | 1.4 | 1.3 | 5.6 |
| 5 | 20 | 75 | −5 | 1.4 | 1.4 | 3.7 |
| 5 | 10 | 85 | −5 | 1.5 | 1.4 | 2.0 |
| 15 | 40 | 45 | −4 | 1.4 | 1.2 | 10.4 |
| 15 | 30 | 55 | −4 | 1.4 | 1.3 | 7.8 |
| 15 | 20 | 65 | −5 | 1.5 | 1.4 | 5.5 |
| 15 | 10 | 75 | −5 | 1.5 | 1.5 | 3.5 |
| 15 | 5 | 80 | −5 | 1.5 | 1.5 | 2.7 |
| 25 | 30 | 45 | −4 | 1.5 | 1.4 | 9.2 |
| 25 | 20 | 55 | −4 | 1.6 | 1.5 | 6.5 |
| 25 | 10 | 65 | −5 | 1.6 | 1.5 | 4.3 |
| 25 | 5 | 70 | −5 | 1.6 | 1.6 | 3.4 |
| 35 | 30 | 35 | −4 | 1.6 | 1.4 | 9.7 |
| 35 | 20 | 45 | −4 | 1.6 | 1.5 | 6.8 |
| 35 | 10 | 55 | −5 | 1.7 | 1.6 | 4.4 |
| 35 | 5 | 60 | −5 | 1.7 | 1.6 | 3.4 |
| 45 | 30 | 25 | −4 | 1.6 | 1.5 | 9.4 |
| 45 | 20 | 35 | −4 | 1.7 | 1.6 | 6.5 |
| 45 | 10 | 45 | −5 | 1.7 | 1.6 | 4.0 |
| 45 | 5 | 50 | −5 | 1.7 | 1.7 | 3.0 |
| 55 | 30 | 15 | −4 | 1.7 | 1.5 | 8.5 |
| 55 | 20 | 25 | −4 | 1.7 | 1.6 | 5.6 |
| 55 | 10 | 35 | −5 | 1.8 | 1.7 | 3.3 |
| 55 | 5 | 40 | −5 | 1.8 | 1.7 | 2.3 |
| 65 | 30 | 5 | −4 | 1.7 | 1.6 | 7.3 |
| 65 | 20 | 15 | −5 | 1.7 | 1.7 | 4.6 |
| 65 | 10 | 25 | −5 | 1.8 | 1.7 | 2.4 |
| 65 | 5 | 30 | −5 | 1.8 | 1.8 | 1.5 |
| 75 | 20 | 5 | −5 | 1.8 | 1.7 | 3.8 |
| 75 | 10 | 15 | −5 | 1.8 | 1.8 | 1.7 |
| 75 | 5 | 20 | −5 | 1.8 | 1.8 | 1.0 |
| 85 | 10 | 5 | −5 | 1.8 | 1.8 | 1.4 |
| 85 | 5 | 10 | −5 | 1.8 | 1.8 | 0.7 |
| 90 | 5 | 5 | −5 | 1.9 | 1.8 | 0.6 |

HFO-1336yf/HFC-134a/HFC-263fb Mixture:

| HFC-134a | HFO-1336yf | HFC-263fb | Temp, (° C.) | P sat liq (bar) | P sat vap (bar) | % pressure diff |
|---|---|---|---|---|---|---|
| 5 | 40 | 55 | −4 | 1.3 | 1.2 | 8.8 |
| 5 | 30 | 65 | −4 | 1.4 | 1.3 | 6.6 |
| 5 | 20 | 75 | −5 | 1.4 | 1.4 | 4.6 |
| 5 | 10 | 85 | −5 | 1.5 | 1.4 | 2.9 |
| 15 | 20 | 65 | −4 | 1.5 | 1.4 | 7.9 |
| 15 | 10 | 75 | −5 | 1.6 | 1.5 | 5.7 |
| 15 | 5 | 80 | −5 | 1.6 | 1.5 | 4.8 |
| 25 | 20 | 55 | −4 | 1.6 | 1.5 | 10.3 |
| 25 | 10 | 65 | −4 | 1.7 | 1.6 | 7.7 |
| 25 | 5 | 70 | −4 | 1.7 | 1.6 | 6.6 |
| 35 | 10 | 55 | −4 | 1.8 | 1.6 | 8.8 |
| 35 | 5 | 60 | −4 | 1.8 | 1.7 | 7.5 |
| 45 | 10 | 45 | −4 | 1.9 | 1.7 | 9.0 |
| 45 | 5 | 50 | −4 | 1.9 | 1.8 | 7.7 |
| 55 | 10 | 35 | −4 | 2.0 | 1.8 | 8.6 |
| 55 | 5 | 40 | −4 | 2.0 | 1.9 | 7.2 |
| 65 | 10 | 25 | −4 | 2.1 | 1.9 | 7.6 |
| 65 | 5 | 30 | −4 | 2.1 | 2.0 | 6.2 |
| 75 | 20 | 5 | −4 | 2.1 | 1.9 | 10.2 |
| 75 | 10 | 15 | −4 | 2.2 | 2.0 | 6.3 |
| 75 | 5 | 20 | −5 | 2.2 | 2.1 | 4.9 |
| 85 | 10 | 5 | −4 | 2.3 | 2.1 | 5.3 |
| 85 | 5 | 10 | −5 | 2.3 | 2.2 | 3.5 |
| 90 | 5 | 5 | −5 | 2.3 | 2.3 | 2.9 |

Example 3—Results for a Moderate-Temperature Refrigeration, Comparison with HFO-1234ze

| | | | Temp evap outlet (° C.) | Temp comp outlet (° C.) | T cond outlet (° C.) | Temp depress inlet (° C.) | evap P (bar) | cond P (bar) | Rate (p/p) | glide (° C.) | comp yield | % CAP | % COP/COPLorenz |
|---|---|---|---|---|---|---|---|---|---|---|---|---|---|
| HFO-1234ze | | | −5 | 62 | 50 | 45 | 1.8 | 10.0 | 5.6 | 0.0 | 76 | 100 | 58 |

| HFC-134a | HFC-134 | HFO-1336yf | | | | | | | | | | | |
|---|---|---|---|---|---|---|---|---|---|---|---|---|---|
| 0 | 75 | 25 | −5 | 63 | 49 | 44 | 2 | 9.9 | 5.8 | 1.0 | 75.5 | 100 | 59 |
| 0 | 80 | 20 | −5 | 64 | 50 | 45 | 2 | 10.1 | 5.8 | 0.7 | 75.6 | 103 | 60 |
| 0 | 85 | 15 | −5 | 65 | 50 | 45 | 2 | 10.2 | 5.7 | 0.4 | 75.6 | 105 | 60 |

| | | | | Temp evap outlet (° C.) | Temp comp outlet (° C.) | T cond outlet (° C.) | Temp depress inlet (° C.) | evap P (bar) | cond P (bar) | Rate (p/p) | glide (° C.) | comp yield | % CAP | % COP/ COPLorenz |
|---|---|---|---|---|---|---|---|---|---|---|---|---|---|---|
| 0 | 90 | 10 | −5 | 66 | 50 | 45 | 2 | 10.4 | 5.7 | 0.3 | 75.7 | 108 | 61 | |
| 0 | 95 | 5 | −5 | 66 | 50 | 45 | 2 | 10.5 | 5.7 | 0.1 | 75.7 | 110 | 62 | |
| 65 | 0 | 35 | −3 | 65 | 48 | 43 | 2 | 10.4 | 5.6 | 4 | 75.9 | 104 | 58 | |
| 70 | 0 | 30 | −3 | 65 | 48 | 43 | 2 | 10.7 | 5.6 | 3 | 76.0 | 109 | 59 | |
| 75 | 0 | 25 | −4 | 66 | 48 | 43 | 2 | 11.1 | 5.5 | 3 | 76.1 | 114 | 60 | |
| 80 | 0 | 20 | −4 | 67 | 49 | 44 | 2 | 11.5 | 5.5 | 2 | 76.2 | 119 | 60 | |
| 85 | 0 | 15 | −4 | 68 | 49 | 44 | 2 | 11.9 | 5.5 | 2 | 76.3 | 123 | 61 | |
| 90 | 0 | 10 | −4 | 69 | 49 | 44 | 2 | 12.3 | 5.4 | 1 | 76.4 | 128 | 62 | |
| 95 | 0 | 5 | −5 | 70 | 50 | 45 | 2 | 12.7 | 5.4 | 1 | 76.4 | 133 | 63 | |
| 5 | 70 | 25 | −4 | 63.18 | 49 | 44 | 2 | 9.9 | 6 | 1.0 | 75.5 | 98 | 58 | |
| 5 | 75 | 20 | −5 | 63.83 | 50 | 45 | 2 | 10.1 | 6 | 0.7 | 75.6 | 102 | 59 | |
| 5 | 80 | 15 | −5 | 64.55 | 50 | 45 | 2 | 10.2 | 6 | 0.5 | 75.6 | 104 | 60 | |
| 5 | 85 | 10 | −5 | 65.34 | 50 | 45 | 2 | 10.4 | 6 | 0.3 | 75.7 | 108 | 61 | |
| 5 | 90 | 5 | −5 | 66.13 | 50 | 45 | 2 | 10.5 | 6 | 0.1 | 75.7 | 110 | 62 | |
| 15 | 70 | 15 | −5 | 64.09 | 50 | 45 | 2 | 10.2 | 6 | 0.5 | 75.6 | 102 | 59 | |
| 15 | 75 | 10 | −5 | 64.85 | 50 | 45 | 2 | 10.4 | 6 | 0.3 | 75.8 | 106 | 60 | |
| 15 | 80 | 5 | −5 | 65.64 | 50 | 45 | 2 | 10.5 | 6 | 0.1 | 75.7 | 109 | 61 | |
| 25 | 60 | 15 | −5 | 63.64 | 50 | 45 | 2 | 10.2 | 6 | 0.6 | 75.7 | 101 | 58 | |
| 25 | 65 | 10 | −5 | 64.42 | 50 | 45 | 2 | 10.4 | 6 | 0.3 | 75.7 | 105 | 59 | |
| 25 | 70 | 5 | −5 | 65.18 | 50 | 45 | 2 | 10.5 | 6 | 0.1 | 75.7 | 108 | 60 | |
| 35 | 55 | 10 | −5 | 64.04 | 50 | 45 | 2 | 10.3 | 6 | 0.4 | 75.7 | 103 | 58 | |
| 35 | 60 | 5 | −5 | 64.74 | 50 | 45 | 2 | 10.5 | 6 | 0.2 | 75.7 | 107 | 60 | |
| 45 | 45 | 10 | −5 | 63.68 | 50 | 45 | 2 | 10.2 | 6 | 0.5 | 75.7 | 101 | 58 | |
| 45 | 50 | 5 | −5 | 64.23 | 50 | 45 | 2 | 10.4 | 6 | 0.2 | 75.8 | 106 | 59 | |
| 55 | 35 | 10 | −5 | 63.24 | 50 | 45 | 2 | 10.1 | 6 | 0.6 | 75.7 | 100 | 57 | |
| 55 | 40 | 5 | −5 | 63.81 | 50 | 45 | 2 | 10.4 | 6 | 0.3 | 75.8 | 104 | 59 | |
| 65 | 30 | 5 | −5 | 63.37 | 50 | 45 | 2 | 10.2 | 6 | 0.3 | 75.8 | 103 | 58 | |
| 75 | 20 | 5 | −5 | 62.86 | 50 | 45 | 2 | 10.1 | 6 | 0.3 | 75.7 | 101 | 58 | |
| 85 | 10 | 5 | −5 | 62.3 | 50 | 45 | 2 | 9.9 | 6 | 0.3 | 75.8 | 99 | 58 | |
| 60 | 5 | 35 | −3 | 64.24 | 48 | 43 | 2 | 10.3 | 6 | 3.6 | 75.8 | 102 | 57 | |
| 65 | 5 | 30 | −3 | 65.03 | 48 | 43 | 2 | 10.7 | 6 | 3.1 | 76.0 | 107 | 58 | |
| 70 | 5 | 25 | −4 | 65.81 | 48 | 43 | 2 | 11.1 | 6 | 2.6 | 76.1 | 111 | 59 | |
| 75 | 5 | 20 | −4 | 66.61 | 49 | 44 | 2 | 11.4 | 5 | 2.1 | 76.2 | 116 | 59 | |
| 80 | 5 | 15 | −4 | 67.46 | 49 | 44 | 2 | 11.8 | 5 | 1.5 | 76.3 | 119 | 59 | |
| 85 | 5 | 10 | −4 | 68.28 | 49 | 44 | 2 | 12.2 | 5 | 1.0 | 76.3 | 125 | 61 | |
| 90 | 5 | 5 | −5 | 69.36 | 50 | 45 | 2 | 12.6 | 5 | 0.5 | 76.4 | 131 | 62 | |
| 55 | 15 | 30 | −3 | 64.35 | 48 | 43 | 2 | 10.5 | 6 | 3.0 | 75.9 | 102 | 56 | |
| 65 | 15 | 20 | −4 | 65.92 | 49 | 44 | 2 | 11.3 | 6 | 2.0 | 76.1 | 111 | 57 | |
| 75 | 15 | 10 | −4 | 67.56 | 49 | 44 | 2 | 12.1 | 5 | 1.0 | 76.3 | 119 | 59 | |
| 80 | 15 | 5 | −5 | 68.6 | 50 | 45 | 2 | 12.5 | 5 | 0.6 | 76.3 | 128 | 61 | |
| 55 | 25 | 20 | −4 | 65.33 | 49 | 44 | 2 | 11.0 | 6 | 2.1 | 76.0 | 107 | 56 | |
| 65 | 25 | 10 | −4 | 67.08 | 49 | 44 | 2 | 11.8 | 6 | 1.1 | 76.1 | 113 | 57 | |
| 70 | 25 | 5 | −5 | 67.91 | 50 | 45 | 2 | 12.2 | 5 | 0.7 | 76.2 | 124 | 60 | |
| 45 | 35 | 20 | −4 | 64.73 | 49 | 44 | 2 | 10.8 | 6 | 2.1 | 75.8 | 104 | 56 | |
| 55 | 35 | 10 | −4 | 66.47 | 49 | 44 | 2 | 11.6 | 6 | 1.2 | 76.0 | 108 | 55 | |
| 60 | 35 | 5 | −5 | 67.25 | 49 | 44 | 2 | 12.0 | 6 | 0.8 | 76.1 | 120 | 60 | |
| 35 | 45 | 20 | −4 | 64.04 | 49 | 44 | 2 | 10.5 | 6 | 2.1 | 75.7 | 101 | 56 | |
| 45 | 45 | 10 | −4 | 65.82 | 49 | 44 | 2 | 11.3 | 6 | 1.2 | 75.9 | 103 | 54 | |
| 50 | 45 | 5 | −5 | 66.56 | 49 | 44 | 2 | 11.7 | 6 | 0.8 | 76.0 | 116 | 59 | |
| 35 | 55 | 10 | −4 | 65.07 | 49 | 44 | 2 | 10.9 | 6 | 1.2 | 75.8 | 101 | 54 | |
| 40 | 55 | 5 | −5 | 65.79 | 49 | 44 | 2 | 11.4 | 6 | 0.9 | 75.9 | 113 | 59 | |
| 25 | 65 | 10 | −4 | 64.18 | 49 | 44 | 2 | 10.6 | 6 | 1.2 | 75.7 | 101 | 56 | |
| 30 | 65 | 5 | −5 | 64.93 | 49 | 44 | 2 | 11.0 | 6 | 0.8 | 75.9 | 109 | 58 | |
| 15 | 75 | 10 | −4 | 63.16 | 49 | 44 | 2 | 10.2 | 6 | 1.0 | 75.7 | 100 | 57 | |
| 20 | 75 | 5 | −5 | 63.97 | 49 | 44 | 2 | 10.6 | 6 | 0.8 | 75.8 | 105 | 58 | |
| 10 | 85 | 5 | −5 | 62.89 | 50 | 45 | 2 | 10.2 | 6 | 0.6 | 75.8 | 102 | 58 | |
| 75 | 0 | 25 | −3 | 57.94 | 48 | 43 | 2 | 10.7 | 5 | 3.8 | 76.5 | 103 | 53 | |
| 80 | 0 | 20 | −3 | 58 | 48 | 43 | 2 | 11.1 | 5 | 3.3 | 76.7 | 107 | 53 | |
| 85 | 0 | 15 | −4 | 57.95 | 49 | 44 | 2 | 11.6 | 5 | 2.6 | 77.0 | 112 | 53 | |
| 90 | 0 | 10 | −4 | 57.81 | 49 | 44 | 2 | 12.0 | 5 | 1.9 | 77.2 | 116 | 53 | |
| 95 | 0 | 5 | −4 | 57.56 | 50 | 45 | 2 | 12.4 | 5 | 1.0 | 77.4 | 121 | 54 | |
| 75 | 5 | 20 | −3 | 58.02 | 48 | 43 | 2 | 11.1 | 5 | 3.2 | 76.7 | 106 | 53 | |
| 85 | 5 | 10 | −4 | 58.08 | 49 | 44 | 2 | 11.9 | 5 | 1.9 | 77.1 | 115 | 53 | |
| 65 | 15 | 20 | −3 | 58.69 | 48 | 43 | 2 | 10.9 | 5 | 3.1 | 76.5 | 105 | 53 | |
| 75 | 15 | 10 | −4 | 58.65 | 49 | 44 | 2 | 11.8 | 5 | 1.9 | 76.9 | 113 | 53 | |
| 80 | 15 | 5 | −4 | 58.47 | 50 | 45 | 2 | 12.2 | 5 | 1.1 | 77.1 | 119 | 54 | |
| 55 | 25 | 20 | −4 | 59.16 | 48 | 43 | 2 | 10.8 | 5 | 3.0 | 76.3 | 103 | 53 | |
| 65 | 25 | 10 | −4 | 59.2 | 49 | 44 | 2 | 11.6 | 5 | 1.9 | 76.7 | 110 | 53 | |
| 70 | 25 | 5 | −4 | 58.97 | 50 | 45 | 2 | 12.0 | 5 | 1.2 | 76.9 | 117 | 54 | |
| 45 | 35 | 20 | −4 | 59.57 | 48 | 43 | 2 | 10.5 | 6 | 2.8 | 76.1 | 100 | 54 | |
| 55 | 35 | 10 | −4 | 59.74 | 49 | 44 | 2 | 11.4 | 5 | 1.8 | 76.5 | 106 | 52 | |
| 60 | 35 | 5 | −4 | 59.68 | 49 | 44 | 2 | 11.8 | 5 | 1.2 | 76.7 | 115 | 55 | |
| 45 | 45 | 10 | −4 | 60.12 | 49 | 44 | 2 | 11.1 | 5 | 1.7 | 76.3 | 103 | 53 | |
| 50 | 45 | 5 | −4 | 60.24 | 49 | 44 | 2 | 11.5 | 5 | 1.3 | 76.6 | 113 | 55 | |
| 35 | 55 | 10 | −4 | 60.63 | 49 | 44 | 2 | 10.8 | 6 | 1.7 | 76.2 | 104 | 54 | |

-continued

| | | | | Temp evap outlet (° C.) | Temp comp outlet (° C.) | T cond outlet (° C.) | Temp depress inlet (° C.) | evap P (bar) | cond P (bar) | Rate (p/p) | glide (° C.) | comp yield | % CAP | % COP/COPLorenz |
|---|---|---|---|---|---|---|---|---|---|---|---|---|---|---|
| 40 | 55 | 5 | −4 | 60.73 | 49 | 44 | 2 | 11.2 | 5 | 1.2 | 76.4 | 110 | 56 | |
| 25 | 65 | 10 | −4 | 60.94 | 49 | 44 | 2 | 10.5 | 6 | 1.5 | 76.0 | 102 | 56 | |
| 30 | 65 | 5 | −4 | 61.13 | 49 | 44 | 2 | 10.9 | 5 | 1.1 | 76.2 | 107 | 56 | |
| 15 | 75 | 10 | −4 | 61.06 | 49 | 44 | 2 | 10.1 | 6 | 1.2 | 75.9 | 100 | 56 | |
| 20 | 75 | 5 | −5 | 61.43 | 49 | 44 | 2 | 10.6 | 6 | 0.9 | 76.0 | 104 | 56 | |
| 10 | 85 | 5 | −5 | 61.49 | 50 | 45 | 2 | 10.2 | 6 | 0.7 | 75.9 | 101 | 57 | |
| 75 | 5 | 20 | −3 | 58.41 | 48 | 43 | 2 | 11.2 | 5 | 3.4 | 76.8 | 108 | 53 | |
| 85 | 5 | 10 | −4 | 58.18 | 49 | 44 | 2 | 12.1 | 5 | 2.0 | 77.2 | 118 | 54 | |
| 90 | 5 | 5 | −4 | 57.91 | 50 | 45 | 3 | 12.5 | 5 | 1.1 | 77.4 | 123 | 54 | |
| 55 | 15 | 30 | −3 | 59.31 | 47 | 42 | 2 | 10.6 | 5 | 4.4 | 76.4 | 101 | 53 | |
| 65 | 15 | 20 | −3 | 59.37 | 48 | 43 | 2 | 11.4 | 5 | 3.5 | 76.8 | 110 | 54 | |
| 75 | 15 | 10 | −4 | 59.08 | 49 | 44 | 2 | 12.2 | 5 | 2.1 | 77.2 | 120 | 54 | |
| 80 | 15 | 5 | −4 | 58.74 | 50 | 45 | 3 | 12.7 | 5 | 1.1 | 77.5 | 125 | 55 | |
| 45 | 25 | 30 | −3 | 60.48 | 47 | 42 | 2 | 10.7 | 5 | 4.4 | 76.3 | 103 | 54 | |
| 55 | 25 | 20 | −3 | 60.46 | 48 | 43 | 2 | 11.5 | 5 | 3.4 | 76.7 | 112 | 54 | |
| 65 | 25 | 10 | −4 | 60.16 | 49 | 44 | 2 | 12.4 | 5 | 2.0 | 77.2 | 122 | 55 | |
| 70 | 25 | 5 | −4 | 59.81 | 50 | 45 | 3 | 12.8 | 5 | 1.1 | 77.4 | 127 | 55 | |
| 35 | 35 | 30 | −3 | 61.69 | 47 | 42 | 2 | 10.8 | 5 | 4.3 | 76.2 | 105 | 55 | |
| 45 | 35 | 20 | −3 | 61.47 | 48 | 43 | 2 | 11.7 | 5 | 3.3 | 76.7 | 114 | 55 | |
| 55 | 35 | 10 | −4 | 61.37 | 49 | 44 | 2 | 12.5 | 5 | 2.0 | 77.1 | 124 | 56 | |
| 60 | 35 | 5 | −4 | 61 | 50 | 45 | 3 | 12.9 | 5 | 1.1 | 77.3 | 129 | 56 | |
| 25 | 45 | 30 | −3 | 62.98 | 48 | 43 | 2 | 10.9 | 6 | 4.0 | 76.1 | 107 | 56 | |
| 35 | 45 | 20 | −3 | 62.72 | 48 | 43 | 2 | 11.8 | 5 | 3.1 | 76.5 | 116 | 56 | |
| 45 | 45 | 10 | −4 | 62.69 | 49 | 44 | 2 | 12.6 | 5 | 1.8 | 77.0 | 126 | 57 | |
| 50 | 45 | 5 | −4 | 62.33 | 50 | 45 | 3 | 13.0 | 5 | 1.0 | 77.2 | 131 | 57 | |
| 15 | 55 | 30 | −3 | 63.93 | 48 | 43 | 2 | 10.9 | 6 | 3.8 | 76.1 | 108 | 57 | |
| 25 | 55 | 20 | −4 | 64.09 | 48 | 43 | 2 | 11.8 | 5 | 2.9 | 76.4 | 118 | 58 | |
| 35 | 55 | 10 | −4 | 64.07 | 49 | 44 | 2 | 12.6 | 5 | 1.7 | 76.9 | 127 | 58 | |
| 40 | 55 | 5 | −5 | 63.76 | 50 | 45 | 3 | 13.0 | 5 | 1.0 | 77.1 | 132 | 58 | |
| 5 | 65 | 30 | −3 | 64.82 | 48 | 43 | 2 | 10.8 | 6 | 3.4 | 76.0 | 109 | 58 | |
| 15 | 65 | 20 | −4 | 65.32 | 48 | 43 | 2 | 11.7 | 5 | 2.6 | 76.3 | 119 | 59 | |
| 25 | 65 | 10 | −4 | 65.46 | 49 | 44 | 2 | 12.6 | 5 | 1.6 | 76.7 | 128 | 59 | |
| 30 | 65 | 5 | −5 | 65.25 | 50 | 45 | 3 | 13.0 | 5 | 0.9 | 76.9 | 133 | 59 | |
| 5 | 75 | 20 | −4 | 66.57 | 49 | 44 | 2 | 11.6 | 5 | 2.3 | 76.2 | 119 | 60 | |
| 15 | 75 | 10 | −4 | 66.8 | 49 | 44 | 2 | 12.5 | 5 | 1.4 | 76.6 | 129 | 60 | |
| 20 | 75 | 5 | −5 | 66.77 | 50 | 45 | 2 | 13.0 | 5 | 0.8 | 76.7 | 134 | 61 | |
| 5 | 85 | 10 | −4 | 68.07 | 49 | 44 | 2 | 12.4 | 5 | 1.2 | 76.4 | 129 | 62 | |
| 10 | 85 | 5 | −5 | 68.23 | 50 | 45 | 2 | 12.9 | 5 | 0.7 | 76.6 | 134 | 62 | |
| 5 | 90 | 5 | −5 | 69.02 | 50 | 45 | 2 | 12.8 | 5 | 0.6 | 76.5 | 133 | 62 | |
| 45 | 5 | 50 | −5 | 62.67 | 49 | 44 | 2 | 9.6 | 6 | 0.5 | 75.9 | 98 | 59 | |
| 55 | 10 | 35 | −5 | 63.07 | 50 | 45 | 2 | 9.8 | 6 | 0.6 | 75.8 | 100 | 59 | |
| 55 | 5 | 40 | −5 | 63.38 | 50 | 45 | 2 | 9.9 | 6 | 0.4 | 75.9 | 101 | 59 | |
| 65 | 20 | 15 | −5 | 63.22 | 49 | 44 | 2 | 9.9 | 6 | 0.9 | 75.6 | 100 | 59 | |
| 65 | 10 | 25 | −5 | 63.82 | 50 | 45 | 2 | 10.1 | 6 | 0.5 | 75.7 | 103 | 60 | |
| 65 | 5 | 30 | −5 | 64.06 | 50 | 45 | 2 | 10.2 | 6 | 0.3 | 75.9 | 105 | 60 | |
| 75 | 20 | 5 | −5 | 63.91 | 50 | 45 | 2 | 10.1 | 6 | 0.7 | 75.6 | 102 | 59 | |
| 75 | 10 | 15 | −5 | 64.49 | 50 | 45 | 2 | 10.3 | 6 | 0.3 | 75.7 | 106 | 60 | |
| 75 | 5 | 20 | −5 | 64.85 | 50 | 45 | 2 | 10.4 | 6 | 0.2 | 75.8 | 107 | 61 | |
| 85 | 10 | 5 | −5 | 65.13 | 50 | 45 | 2 | 10.4 | 6 | 0.3 | 75.7 | 108 | 61 | |
| 85 | 5 | 10 | −5 | 65.58 | 50 | 45 | 2 | 10.5 | 6 | 0.1 | 75.8 | 109 | 61 | |
| 90 | 5 | 5 | −5 | 65.88 | 50 | 45 | 2 | 10.5 | 6 | 0.1 | 75.7 | 110 | 62 | |
| 35 | 5 | 60 | −4 | 63.28 | 49 | 44 | 2 | 9.7 | 6 | 1.3 | 76.1 | 99 | 59 | |
| 45 | 20 | 35 | −4 | 63.9 | 48 | 43 | 2 | 10.0 | 6 | 2.2 | 75.8 | 101 | 58 | |
| 45 | 10 | 45 | −4 | 64.3 | 49 | 44 | 2 | 10.2 | 6 | 1.6 | 76.0 | 104 | 59 | |
| 45 | 5 | 50 | −4 | 64.53 | 49 | 44 | 2 | 10.2 | 6 | 1.4 | 76.1 | 105 | 59 | |
| 55 | 30 | 15 | −3 | 64.44 | 48 | 43 | 2 | 10.3 | 6 | 3.1 | 75.7 | 102 | 58 | |
| 55 | 20 | 25 | −4 | 65.08 | 48 | 43 | 2 | 10.5 | 6 | 2.3 | 75.9 | 106 | 59 | |
| 55 | 10 | 35 | −4 | 65.49 | 49 | 44 | 2 | 10.7 | 6 | 1.6 | 76.0 | 109 | 60 | |
| 55 | 5 | 40 | −4 | 65.71 | 49 | 44 | 2 | 10.8 | 6 | 1.3 | 76.1 | 111 | 60 | |
| 65 | 30 | 5 | −3 | 65.26 | 48 | 43 | 2 | 10.6 | 6 | 3.1 | 75.9 | 107 | 58 | |
| 65 | 20 | 15 | −4 | 65.99 | 49 | 44 | 2 | 11.0 | 6 | 2.2 | 76.0 | 111 | 59 | |
| 65 | 10 | 25 | −4 | 66.58 | 49 | 44 | 2 | 11.2 | 6 | 1.5 | 76.1 | 115 | 60 | |
| 65 | 5 | 30 | −4 | 66.82 | 49 | 44 | 2 | 11.3 | 6 | 1.2 | 76.2 | 116 | 61 | |
| 75 | 20 | 5 | −4 | 66.78 | 49 | 44 | 2 | 11.4 | 6 | 2.1 | 76.1 | 116 | 60 | |
| 75 | 10 | 15 | −4 | 67.56 | 49 | 44 | 2 | 11.7 | 6 | 1.3 | 76.2 | 121 | 61 | |
| 75 | 5 | 20 | −5 | 67.86 | 49 | 44 | 2 | 11.8 | 5 | 1.0 | 76.2 | 122 | 61 | |
| 85 | 10 | 5 | −4 | 68.42 | 49 | 44 | 2 | 12.2 | 6 | 1.1 | 76.3 | 126 | 62 | |
| 85 | 5 | 10 | −5 | 68.71 | 50 | 45 | 2 | 12.3 | 5 | 0.7 | 76.3 | 128 | 62 | |
| 90 | 5 | 5 | −5 | 69.26 | 50 | 45 | 2 | 12.5 | 5 | 0.6 | 76.3 | 131 | 63 | |

The invention claimed is:

1. A quasi-azeotropic composition consisting of:
   a mixture of 5-30% by weight of 2,3,3,4,4,4-hexafluorobut-1-ene and 70-95% by weight of trans-1,3,3,3-tetrafluoropropene,
wherein the difference between the liquid saturation pressure and the vapor saturation pressure at a temperature of −5° C. is less than or equal to 10% of the liquid saturation pressure.

2. The composition as claimed in claim 1, which is non-flammable.

3. A heat-transfer composition, comprising the composition as claimed in claim 1 as heat-transfer fluid, and also one or more additives chosen from lubricants, stabilizers, surfactants, tracers, fluorescers, odorous agents and solubilizers, and mixtures thereof.

4. A heat transfer installation comprising a vapor compression circuit containing a composition as claimed in claim 1 as heat-transfer fluid optionally with one or more additives chosen from lubricants, stabilizers, surfactants, tracers, fluorescers, odorous agents and solubilizers, and mixtures thereof.

5. The installation as claimed in claim 4, chosen from mobile or stationary heat-pump heating, air-conditioning, refrigeration, freezing and Rankine cycle installations.

6. A process for heating or cooling a fluid or a body by means of a vapor compression circuit containing a heat-transfer fluid, said process successively comprising the evaporation of the heat-transfer fluid, the compression of the heat-transfer fluid, the condensation of the heat fluid and the depressurization of the heat-transfer fluid, in which the heat-transfer fluid is a composition as claimed in claim 1.

7. The process as claimed in claim 6, which is a process for cooling a fluid or a body, in which the temperature of the cooled fluid or body is from −15° C. to 15° C.; or which is a process for heating a fluid or a body, in which the temperature of the heated fluid or body is from 30° C. to 90° C.

8. A process for reducing the environmental impact of a heat-transfer installation comprising a vapor compression circuit containing an initial heat-transfer fluid, said process comprising a step of replacing the initial heat-transfer fluid in the vapor compression circuit with a final transfer fluid, the final transfer fluid having a lower GWP than the initial heat-transfer fluid, in which the final heat-transfer fluid is a composition as claimed in claim 1.

9. A quasi-azeotropic composition consisting of:
   a mixture of 5-30% by weight of 2,3,3,4,4,4-hexafluorobut-1-ene and 70-95% by weight of trans-1,3,3,3-tetrafluoropropene.

10. The quasi-azeotropic composition as claimed in claim 9, which is non-flammable.

11. A heat-transfer composition, comprising the quasi-azeotropic composition as claimed in claim 9 as heat-transfer fluid, and also one or more additives chosen from lubricants, stabilizers, surfactants, tracers, fluorescers, odorous agents and solubilizers, and mixtures thereof.

12. A heat transfer installation comprising a vapor compression circuit containing a quasi-azeotropic composition as claimed in claim 9 as heat-transfer fluid optionally with one or more additives chosen from lubricants, stabilizers, surfactants, tracers, fluorescers, odorous agents and solubilizers, and mixtures thereof.

13. The installation as claimed in claim 12, chosen from mobile or stationary heat-pump heating, air-conditioning, refrigeration, freezing and Rankine cycle installations.

14. A process for heating or cooling a fluid or a body by means of a vapor compression circuit containing a heat-transfer fluid, said process successively comprising the evaporation of the heat-transfer fluid, the compression of the heat-transfer fluid, the condensation of the heat fluid and the depressurization of the heat-transfer fluid, in which the heat-transfer fluid is a quasi-azeotropic composition as claimed in claim 9.

15. The process as claimed in claim 14, which is a process for cooling a fluid or a body, in which the temperature of the cooled fluid or body is from −15° C. to 15° C.; or which is a process for heating a fluid or a body, in which the temperature of the heated fluid or body is from 30° C. to 90° C.

16. A process for reducing the environmental impact of a heat-transfer installation comprising a vapor compression circuit containing an initial heat-transfer fluid, said process comprising a step of replacing the initial heat-transfer fluid in the vapor compression circuit with a final transfer fluid, the final transfer fluid having a lower GWP than the initial heat-transfer fluid, in which the final heat-transfer fluid is a composition as claimed in claim 9.

* * * * *